(12) United States Patent
Ikeda et al.

(10) Patent No.: US 12,372,380 B2
(45) Date of Patent: Jul. 29, 2025

(54) RESOLVER AND ELECTRIC POWER STEERING DEVICE

(71) Applicant: Mitsubishi Electric Corporation, Tokyo (JP)

(72) Inventors: Hiroko Ikeda, Tokyo (JP); Tatsuya Mori, Tokyo (JP); Toshihiro Matsunaga, Tokyo (JP); Kenji Ikeda, Tokyo (JP); Kenta Kubo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 67 days.

(21) Appl. No.: 17/785,617

(22) PCT Filed: Jan. 17, 2020

(86) PCT No.: PCT/JP2020/001550
§ 371 (c)(1),
(2) Date: Jun. 15, 2022

(87) PCT Pub. No.: WO2021/144977
PCT Pub. Date: Jul. 22, 2021

(65) Prior Publication Data
US 2023/0013379 A1    Jan. 19, 2023

(51) Int. Cl.
*G01D 5/20*   (2006.01)
*B62D 5/04*   (2006.01)

(52) U.S. Cl.
CPC ........... *G01D 5/2046* (2013.01); *B62D 5/046* (2013.01)

(58) Field of Classification Search
None
See application file for complete search history.

(56) References Cited

U.S. PATENT DOCUMENTS

| | | | |
|---|---|---|---|
| 7,268,537 B2 * | 9/2007 | Nakano | G01D 5/2046 310/68 B |
| 2013/0049741 A1 * | 2/2013 | Kichise | G01D 5/2046 324/207.16 |

(Continued)

FOREIGN PATENT DOCUMENTS

| | | |
|---|---|---|
| EP | 1 416 254 A1 | 5/2004 |
| JP | 2004-151040 A | 5/2004 |

(Continued)

OTHER PUBLICATIONS

Ikeda, Hiroko et al.; Rotation Angle Detecting Device and Dynamo-Electric Machine; Date Published Jul. 6, 2017; WO2017115414A1; Mitsubishi Electric Corp [JP]; CPC H 02 K 11/225 (Year: 2017).*

(Continued)

*Primary Examiner* — Nasima Monsur
(74) *Attorney, Agent, or Firm* — Sughrue Mion, PLLC

(57) ABSTRACT

Provided is a resolver capable of increasing an accuracy of a detected angle of the resolver. The resolver includes: a stator; and a rotor, wherein the rotor includes a plurality of salient poles; wherein the stator includes: a stator core having a plurality of teeth, and a plurality of winding groups each of which is provided on each of the plurality of teeth, wherein the winding groups are divided into two systems, wherein the numbers of turns of the excitation windings are distributed in a form of a sine wave of $N_e$-th spatial order, wherein each of the numbers of turns of a first output windings and the numbers of turns of a second output windings are distributed in a form of a sine wave of $|N_e \pm N_x|$-th spatial order, and wherein the following expressions are satisfied, $N_{out1} = N_1 \cos\{|N_e \pm N_x|(i-1)/N_s \times 2\pi + \alpha\}$, $N_{out2} = N_1 \cos\{|N_e \pm N_x|(i-1)/N_s \times 2\pi + \beta\}$, and $90(\deg) < |\alpha - \beta| < 140(\deg)$.

5 Claims, 16 Drawing Sheets

(56) References Cited

U.S. PATENT DOCUMENTS

| | | | | |
|---|---|---|---|---|
| 2015/0022186 A1* | 1/2015 | Ausserlechner | ......... | G01B 7/30 |
| | | | | 324/207.13 |
| 2017/0288510 A1* | 10/2017 | Takiguchi | ............ | G01D 5/2046 |
| 2018/0172479 A1* | 6/2018 | Kashima | .............. | G01D 5/2046 |

FOREIGN PATENT DOCUMENTS

| | | |
|---|---|---|
| JP | 4157930 B2 | 10/2008 |
| JP | 2009-014367 A | 1/2009 |
| JP | 2009-222435 A | 10/2009 |
| JP | 6242116 B2 | 12/2017 |
| WO | 2017/179207 A1 | 10/2017 |
| WO | 2019/123592 A1 | 6/2019 |

OTHER PUBLICATIONS

International Search Report for PCT/JP2020/001550, dated Mar. 31, 2020.
Extended European Search Report issued Dec. 5, 2022 in European Application No. 20914217.3.

* cited by examiner

RESOLVER AND ELECTRIC POWER STEERING DEVICE

CROSS REFERENCE TO RELATED APPLICATIONS

This application is a National Stage of International Application No. PCT/JP2020/001550 filed Jan. 17, 2020.

TECHNICAL FIELD

This disclosure relates to a resolver and an electric power steering device.

BACKGROUND ART

Hitherto, there has been known a resolver including a stator and a rotor that rotates with respect to the stator. The stator includes a stator core, a plurality of excitation windings, and a plurality of output windings. The stator core has a plurality of teeth arranged in a circumferential direction. The plurality of excitation windings are each provided to each tooth. The plurality of output windings are each provided to each tooth. The excitation windings and the output windings are divided into a first system and a second system, respectively. An output signal of the output windings in the first system is used to calculate an angle of the rotor. An output signal of the output windings in the second system is used to calculate the angle of the rotor. Accordingly, even when a failure occurs to one of the first system or the second system, the angle of the rotor is calculated. As a result, the resolver can more reliably detect the angle of the rotor (for example, see Patent Literature 1).

CITATION LIST

Patent Literature

[PTL 1] JP 4157930

SUMMARY OF INVENTION

Technical Problem

However, one excitation winding in the first system and one excitation winding in the second system are wound on two teeth next to each other in the circumferential direction, respectively. Accordingly, magnetic interference occurs between the first system and the second system. As a result, there is such a problem that an accuracy of a detected angle of the resolver is lowered.

This disclosure has been made in view of the above-mentioned problem, and has an object of providing a resolver and an electric power steering device capable of improving an accuracy of a detected angle of the resolver.

Solution to Problem

According to this disclosure, there is provided a resolver, including: a stator; and a rotor which rotates with respect to the stator, wherein the rotor includes a plurality of salient poles; wherein the stator includes: a stator core having a plurality of teeth arranged in a circumferential direction, and a plurality of winding groups each of which is provided on each tooth, and has an excitation winding, a first output winding, and a second output winding, wherein the winding groups are divided into a plurality of systems, wherein the numbers of turns of the excitation windings are distributed in a form of a sine wave of $N_e$-th spatial order, wherein each of the numbers of turns of the first output windings and the numbers of turns of the second output windings are distributed in a form of a sine wave of $|N_e \pm N_x|$-th spatial order where $N_x$ is the number of salient poles, and wherein the following expressions are satisfied, $$N_{out1} = N_1 \cos\{|N_e \pm N_x|(i-1)/N_s \times 2\pi + \alpha\},$$

$$N_{out2} = N_1 \cos\{|N_e \pm N_x|(i-1)/N_s \times 2\pi + \beta\}, \text{ and}$$

$$90(\deg) < |\alpha - \beta| < 140(\deg)$$

where $N_s$ is the number of teeth, "i" is a natural number being one of 1, 2, ..., or $N_s$, $N_{out1}$ is the number of turns of the first output winding wound on an i-th tooth, $N_{out2}$ is the number of turns of the second output winding wound on the i-th tooth, $N_1$ is an amplitude of each of the number of turns of the first output winding and the number of turns of the second output winding, $\alpha$ is a positive number and is an initial phase of the numbers of turns of the first output windings, and $\beta$ is a positive number and is an initial phase of the numbers of turns of the second output windings.

Advantageous Effects of Invention

According to this disclosure, the resolver can improve the accuracy of the detected angle of the resolver.

DESCRIPTION OF EMBODIMENTS

First Embodiment

Figure 1:
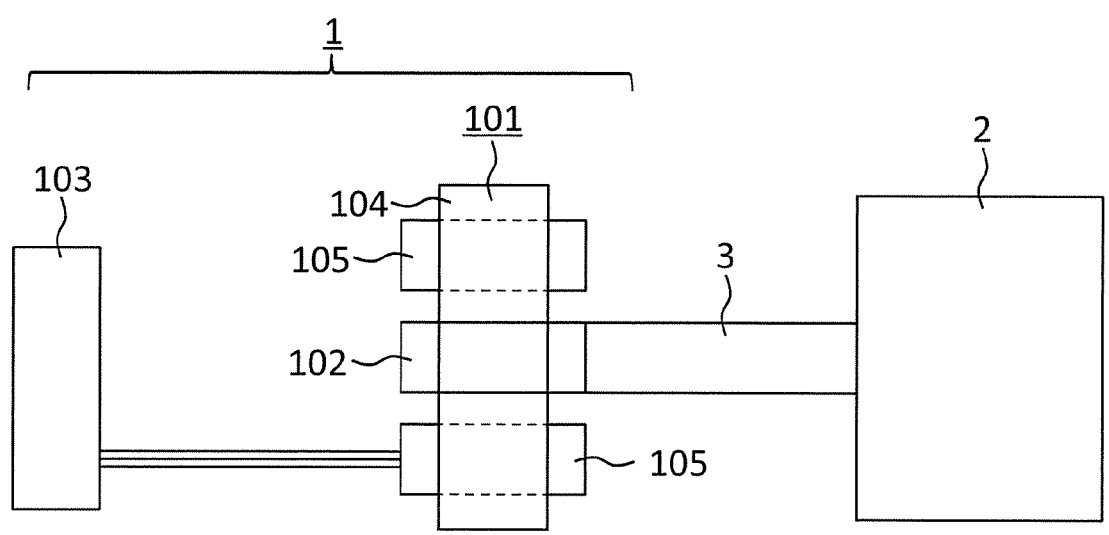
FIG. 1 is a configuration diagram for illustrating a resolver according to a first embodiment and a rotating electric machine to which the resolver is mounted.

FIG. 1 is a configuration diagram for illustrating a resolver according to a first embodiment and a rotating electric machine to which the resolver is mounted. A resolver 1 includes a stator 101, a rotor 102, and an angle calculation device 103. The rotor 102 rotates with respect to the stator 101. The angle calculation device 103 is configured to calculate an angle of the rotor 102.

The stator 101 includes a stator core 104 in an annular shape and a plurality of winding groups 105 provided on the stator core 104. The rotor 102 is mounted to a shaft 3 connected to a rotating electric machine 2. The rotor 102 rotates together with the shaft 3. The resolver 1 calculates an angle of the rotor 102, to thereby detect an angle of the shaft 3. An angle of a rotating-electric-machine rotor of the rotating electric machine 2 is detected through the detection of the angle of the shaft 3.

In this example, an axial direction is an axial direction of the stator core 104, a radial direction is a radial direction of the stator core 104, and a circumferential direction is a circumferential direction of the stator core 104.

Figure 2:
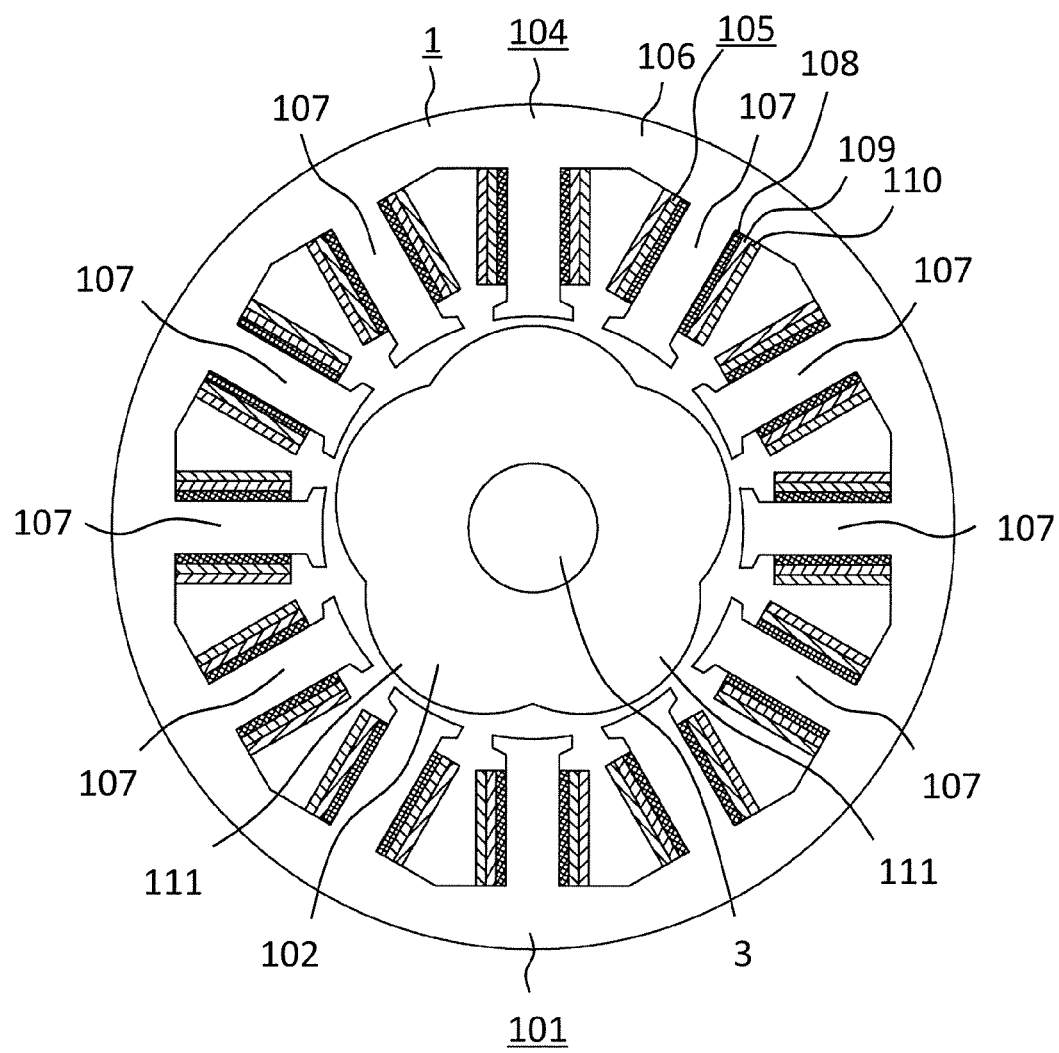
FIG. 2 is a sectional view for illustrating the resolver of FIG. 1.

FIG. 2 is a sectional view for illustrating the resolver 1 of FIG. 1. In FIG. 2, a cross section of the resolver 1 taken along a plane perpendicular to the axial direction is illustrated. The stator core 104 includes a back yoke 106 in an annular shape and a plurality of teeth 107. The plurality of teeth 107 extend toward the inside from the back yoke 106 in the radial direction. The plurality of teeth 107 are arranged side by side in the circumferential direction. On each tooth 107, each of the plurality of winding groups 105 is provided. Each winding group 105 includes an excitation winding 108, a first output winding 109, and a second output winding 110.

In an outside portion of the rotor 102 in the radial direction, a plurality of salient poles 111 are formed. The plurality of salient poles 111 are arranged side by side in the circumferential direction. The number $N_x$ of the salient poles 111 is five. Thus, the number $N_x$ of the salient poles 111 is an odd number. The number $N_x$ of the salient poles 111 is also referred to as a multiplication factor. Thus, the multiplication factor is five.

Figure 3:
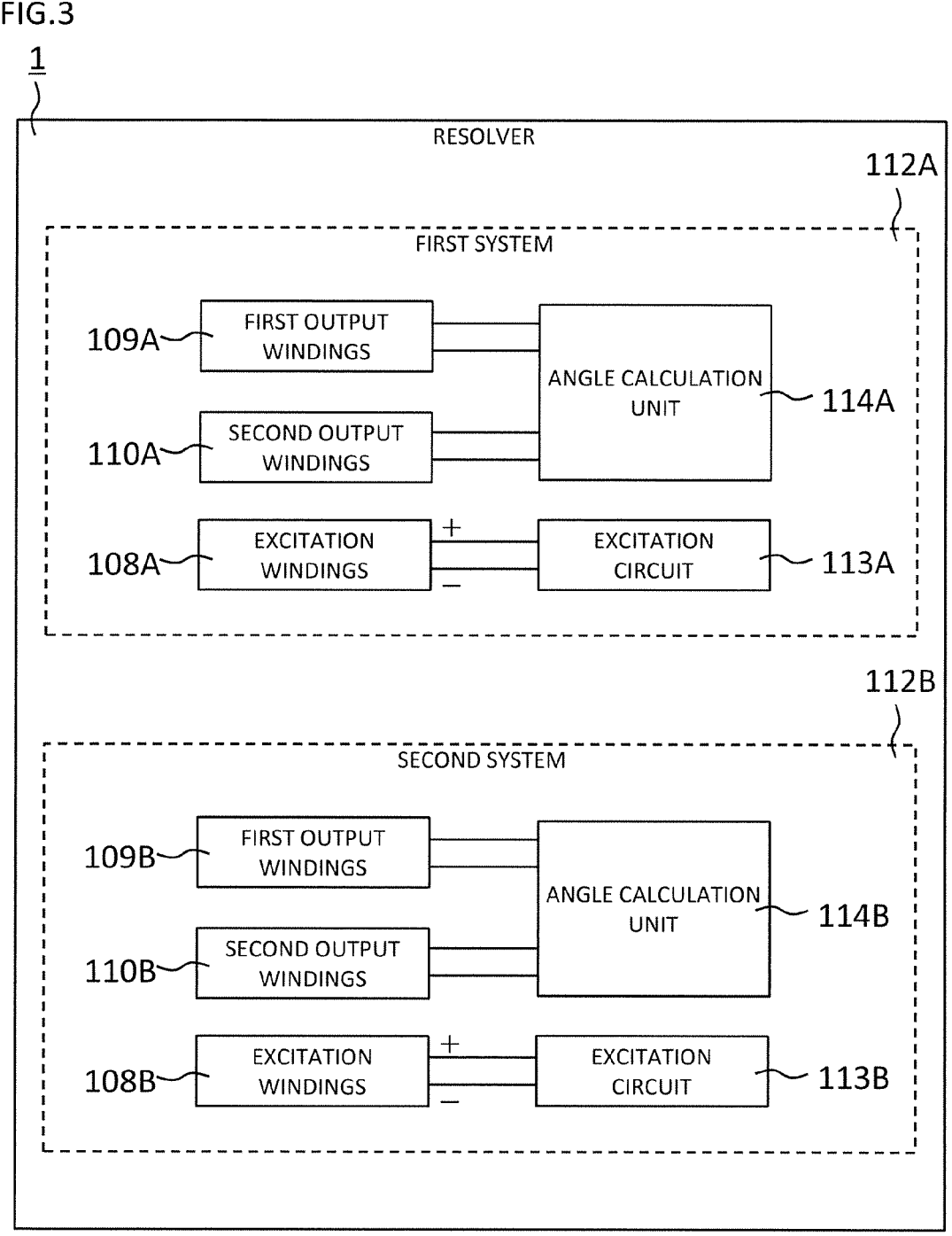
FIG. 3 is a block diagram for illustrating the resolver of FIG. 1.

FIG. 3 is a block diagram for illustrating the resolver 1 of FIG. 1. The resolver 1 includes a plurality of systems. In this example, the number M of systems is two. That is, the resolver 1 includes a first system 112A and a second system 112B. The winding groups 105 are divided into the first system 112A and the second system 112B.

Each of the winding groups 105 included in the first system 112A includes an excitation winding 108A, a first output winding 109A, and a second output winding 110A. Each of the winding groups 105 included in the second system 112B includes an excitation winding 108B, a first output winding 109B, and a second output winding 110B.

The resolver 1 includes an excitation circuit 113A included in the first system 112A, an excitation circuit 113B included in the second system 112B, an angle calculation unit 114A included in the first system 112A, and an angle calculation unit 114B included in the second system 112B. The angle calculation unit 114A and the angle calculation unit 114B are included in the angle calculation device 103 of FIG. 1.

To the excitation windings 108A, an excitation signal is supplied from the excitation circuit 113A. A magnetic field is generated on the excitation windings 108A as a result of a flow of the excitation signal through the excitation windings 108A. An output signal of the first output windings 109A and an output signal of the second output windings 110A are input to the angle calculation unit 114A. The angle calculation unit 114A uses the output signal of the first output windings 109A and the output signal of the second output windings 110A to calculate the angle of the rotor 102.

To the excitation windings 108B, an excitation signal is supplied from the excitation circuit 113B. A magnetic field is generated on the excitation windings 108B as a result of a flow of the excitation signal through the excitation windings 108B. An output signal of the first output windings 109B and an output signal of the second output windings 110B are input to the angle calculation unit 114B. The angle calculation unit 114B uses the output signal of the first output windings 109B and the output signal of the second output windings 110B to calculate the angle of the rotor 102.

Figure 4:
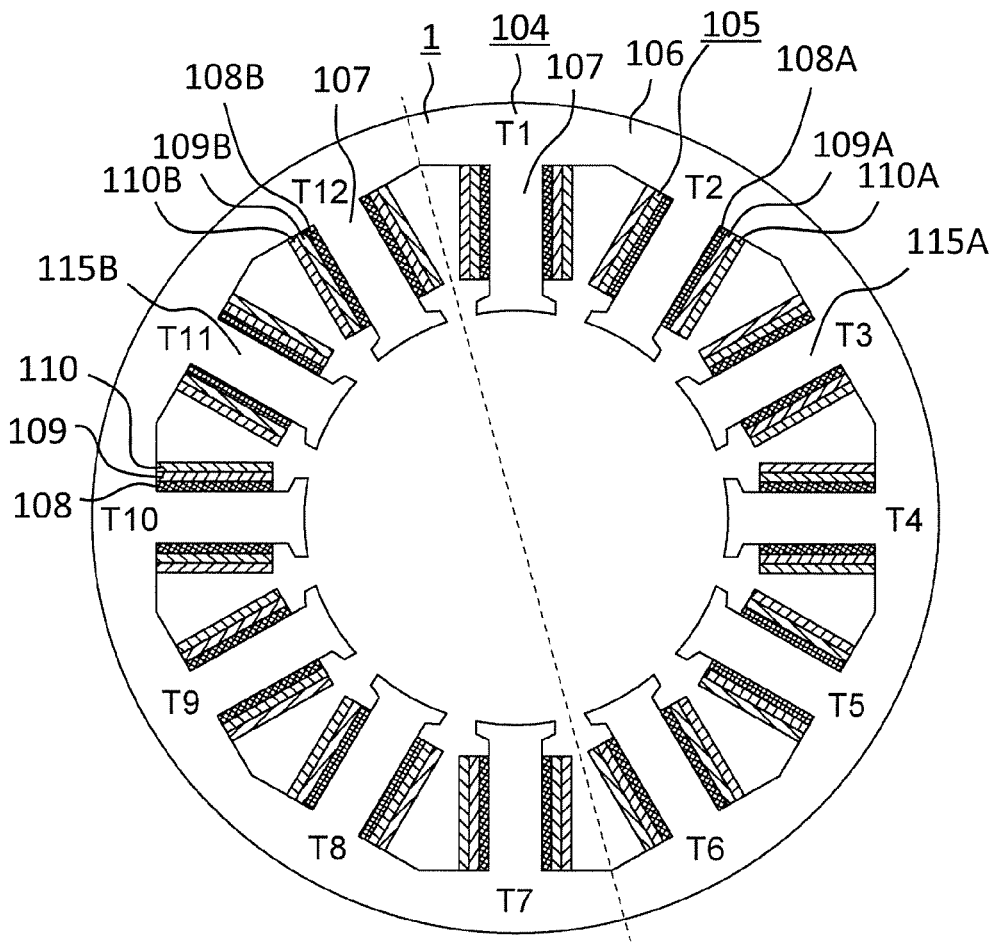
FIG. 4 is a sectional view for illustrating a stator of FIG. 2.

FIG. 4 is a sectional view for illustrating the stator 101 of FIG. 2. A teeth number being the number of teeth 107 is $N_s$. The teeth number $N_s$ is twelve. In FIG. 4, the twelve teeth 107 are numbered from T1 to T12 in the stated order in the circumferential direction. The twelve teeth 107 is divided into two groups. The teeth 107 arranged in the circumferential direction, and numbered from T1 to T6 are included in a first tooth group 115A. The teeth 107 arranged in the circumferential direction, and numbered from T7 to T12 are included in a second tooth group 115B. The first tooth group 115A and the second tooth group 115B are next to each other in the circumferential direction.

On each tooth 107 included in the first tooth group 115A, the excitation winding 108A, the first output winding 109A, and the second output winding 110A are wound. On each tooth 107 included in the second tooth group 115B, the excitation winding 108B, the first output winding 109B, and the second output winding 110B are wound.

As illustrated in FIG. 3, the excitation windings 108A are connected to the excitation circuit 113A through excitation terminals (not shown). The excitation windings 108B are connected to the excitation circuit 113B through excitation terminals (not shown). The excitation circuit 113A and the excitation circuit 113B are independent of each other.

The first output windings 109A and the second output windings 110A are connected to the angle calculation unit 114A through output terminals (not shown), respectively. The first output windings 109B and the second output windings 110B are connected to the angle calculation unit 114B through output terminals (not shown), respectively.

The angle calculation unit 114A uses the output signal of the first output windings 109A and the output signal of the second output windings 110A to calculate a first detected angle θ1 as the angle of the rotor 102. The angle calculation unit 114B uses the output signal of the first output windings 109B and the output signal of the second output windings 110B to calculate a second detected angle θ2 as the angle of the rotor 102.

As illustrated in FIG. 4, on each of the teeth 107 numbered from T1 to T6, the excitation winding 108A is wound. The first output winding 109A is wound outside the excitation winding 108A, and the second output winding 110A is wound outside the first output winding 109A. Which of the first output winding 109A or the second output winding 110A is wound first may be freely determined.

On each of the teeth 107 numbered from T7 to T12, the excitation winding 108B is wound. The first output winding 109B is wound outside the excitation winding 108B, and the second output winding 110B is wound outside the first output winding 109B. Which of the first output winding 109B or the second output winding 110B is wound first may be freely determined.

Insulation between the winding groups 105 and the stator core 104 is achieved by an insulator (not shown). Examples of the insulator include insulation paper and coating.

In FIG. 4, illustration is given of a state in which the first output windings 109A and the second output windings 110A are wound on all of the teeth 107 numbered from T1 to T6. However, the six teeth 107 numbered from T1 to T6 may include teeth 107 on each of which both of the first output winding 109A and the second output winding 110A are wound, and teeth 107 on each of which one of the first output winding 109A or the second output winding 110A is wound.

Further, in FIG. 4, illustration is given of a state in which the first output windings 109B and the second output windings 110B are wound on all of the teeth 107 numbered from T7 to T12. However, the six teeth 107 numbered from T7 to T12 may include teeth 107 on each of which both of the first output winding 109B and the second output winding 110B are wound, and teeth 107 on each of which one of the first output winding 109B or the second output winding 110B is wound.

All of the excitation windings 108A wound on the teeth 107 numbered from T1 to T6 are connected to each other in series. All of the first output windings 109A wound on the teeth 107 numbered from T1 to T6 are connected to each other in series. All of the second output windings 110A wound on the teeth 107 numbered from T1 to T6 are connected to each other in series.

All of the excitation windings 108B wound on the teeth 107 numbered from T7 to T12 are connected to each other in series. All of the first output windings 109B wound on the teeth 107 numbered from T7 to T12 are connected to each other in series. All of the second output windings 110B wound on the teeth 107 numbered from T7 to T12 are connected to each other in series.

In this example, description is given of such a configuration that the winding groups 105 are wound on the teeth 107 numbered T1 to the tooth 107 numbered T6 in the stated order. Note that, there may be provided such a configuration that the winding groups 105 are wound all of the teeth 107 numbered from T1 to T6 starting from any tooth 107, that is, the teeth numbered from T1 to T6, and is other than the tooth 107 numbered T1.

Further, in this example, description is given of such a configuration that the winding groups 105 are wound on the teeth 107 numbered T7 to the tooth 107 numbered T12 in the stated order. Note that, there may be provided such a configuration that the winding groups 105 are wound all of the teeth 107 numbered from T7 to T12 starting from any tooth 107, that is, the teeth numbered from T7 to T12, and is other than the tooth 107 numbered T7.

Moreover, in this example, description is given of such a configuration that the excitation winding 108, the first output winding 109, and the second output winding 110 are wound around the tooth 107 in a layered form in the stated order. However, there may be provided in such a configuration that the excitation winding 108, the first output winding 109, and the second output winding 110 may be arranged in the radial direction. In this case, the orders of the arrangement of the excitation winding 108, the first output winding 109, and the second output winding 110 in the radial direction may be different from one another among the teeth 107.

Figure 5:
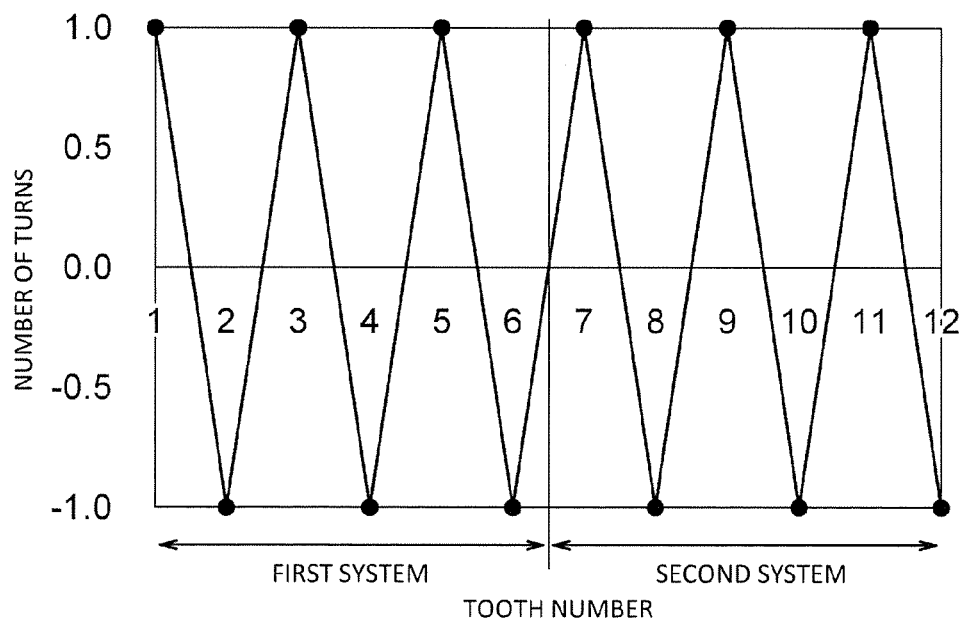
FIG. 5 is a graph for showing the numbers of turns of excitation windings of FIG. 4.

FIG. 5 is a graph for showing the numbers of turns of the excitation windings 108 of FIG. 4. In FIG. 5, values of the numbers of turns assigned to the vertical axis are normalized through use of values of amplitudes of the numbers of turns of the excitation windings 108. In FIG. 5, values between the numbers of turns of the two excitation windings 108 next to each other in the circumferential direction are linearly interpolated. Moreover, in FIG. 5, regarding a direction of the winding of each excitation winding 108, one direction of the winding is set to +, and the other direction of the winding is set to −.

The excitation windings 108 are arranged such that two excitation windings 108 next to each other in the circumferential direction have winding directions different from each other. The number of turns of the excitation windings 108 are the same as one another. The number of turns of the excitation windings 108 is distributed in a form of a sine wave of $N_e$-th spatial order. $N_e$ is a spatial order of the excitation windings 108. In this example, the spatial order $N_e$ is six. The spatial order $N_e$ of the excitation windings 108 may be three.

Figure 6:
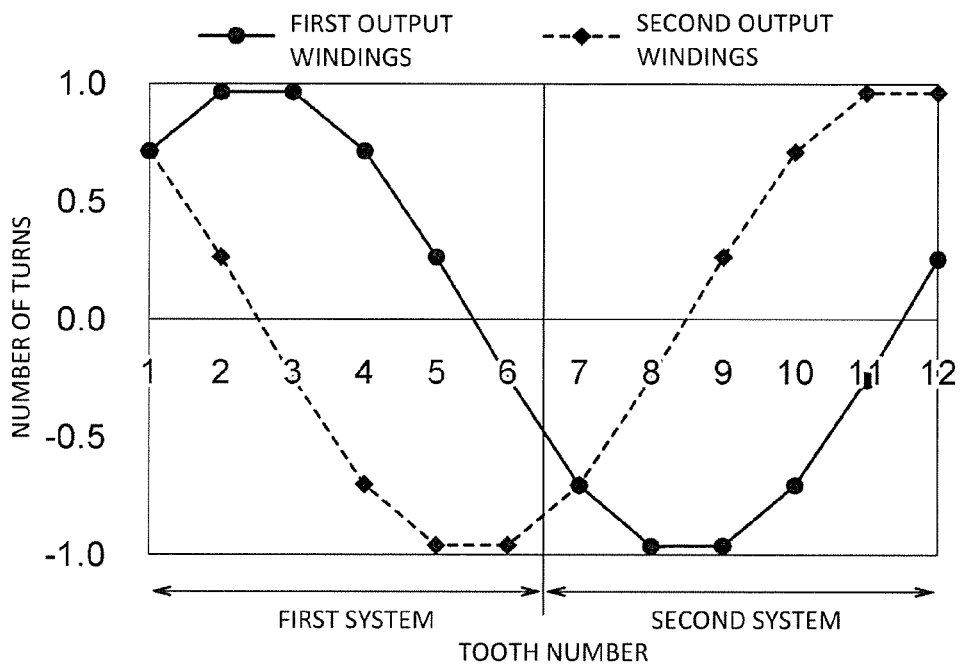
FIG. 6 is a graph for showing the numbers of turns of first output windings and the numbers of turns of second output windings of the resolver in a comparative example.

FIG. 6 is a graph for showing the numbers of turns of the first output windings 109 and the numbers of turns of the second output windings 110 of the resolver 1 in a comparative example. In FIG. 6, values of the numbers of turns assigned to a vertical axis are normalized through use of values of amplitudes of the numbers of turns of the first output windings 109 and values of amplitudes of the numbers of turns of the second output windings 110, respectively. In FIG. 6, values between the numbers of turns of the two first output windings 109 next to each other in the circumferential direction are linearly interpolated. Moreover, values between the numbers of turns of the two second output windings 110 next to each other in the circumferential direction are linearly interpolated.

The number of turns of the first output winding 109 wound on an i-th tooth 107 being any one of the teeth 107 numbered from T1 to T12 is $N_{out1}$. The number of turns of the second output winding 110 wound on the i-th tooth 107 is $N_{out2}$. In this case, a phase difference between the number of turns $N_{out1}$ and the number of turns $N_{out2}$ is 90 (deg), and satisfies Expression (1), Expression (2), and Expression (3), which are given below.

$$N_{out1}=N_1 \cos\{|N_e \pm N_x|(i-1)/N_s \times 2\pi + \alpha\} \qquad (1)$$

$$N_{out2}=N_1 \cos\{|N_e \pm N_x|(i-1)/N_s \times 2\pi + \beta\} \qquad (2)$$

$$|\alpha - \beta| = 90 (\deg) \qquad (3)$$

$N_1$ indicates the amplitude of each of the number of turns of the first output winding 109 and the number of turns of the second output winding 110. α indicates an initial phase of the numbers of turns of the first output windings 109. β indicates an initial phase of the numbers of turns of the second output windings 110. α and β are positive numbers. The spatial order $N_e$ of the excitation windings 108 is six, the multiplication factor $N_x$ is five, and the spatial order of each of the first output winding 109 and the spatial order of the second output winding 110 is one. Thus, $|N_e \pm N_x|$ is different from integer multiples of the number M of systems.

Each of the numbers of turns of the first output windings 109 and the numbers of turns of the second output windings 110 are distributed in a form of a sine wave of $|N_e \pm N_x|$-th spatial order when the teeth number is assigned to the horizontal axis, and the numbers of turns are assigned to the vertical axis. When the number of turns includes a decimal fraction, the decimal fraction is rounded so that the number of turns is an integer.

In the first embodiment, the excitation circuit 113A and the excitation circuit 113B are independent of each other. Thus, the excitation circuit 113A and the excitation circuit 113B cannot be synchronized with each other. A variation occurs between a microcomputer forming the excitation circuit 113A and a microcomputer forming the excitation circuit 113B. Thus, even when the microcomputers are designed such that the frequency of the excitation signal supplied to the excitation windings 108A and the frequency of the excitation signal supplied to the excitation windings 108B match with each other, the respective frequencies do not completely match with each other. Moreover, a difference in phase between the excitation signal supplied to the excitation windings 108A and the excitation signal supplied to the excitation windings 108B is not constant, and varies as the time elapses. Thus, the excitation circuit 113A in the first system 112A influences the second system 112B, and the excitation circuit 113B in the second system 112B influences the first system 112A.

Figure 7:
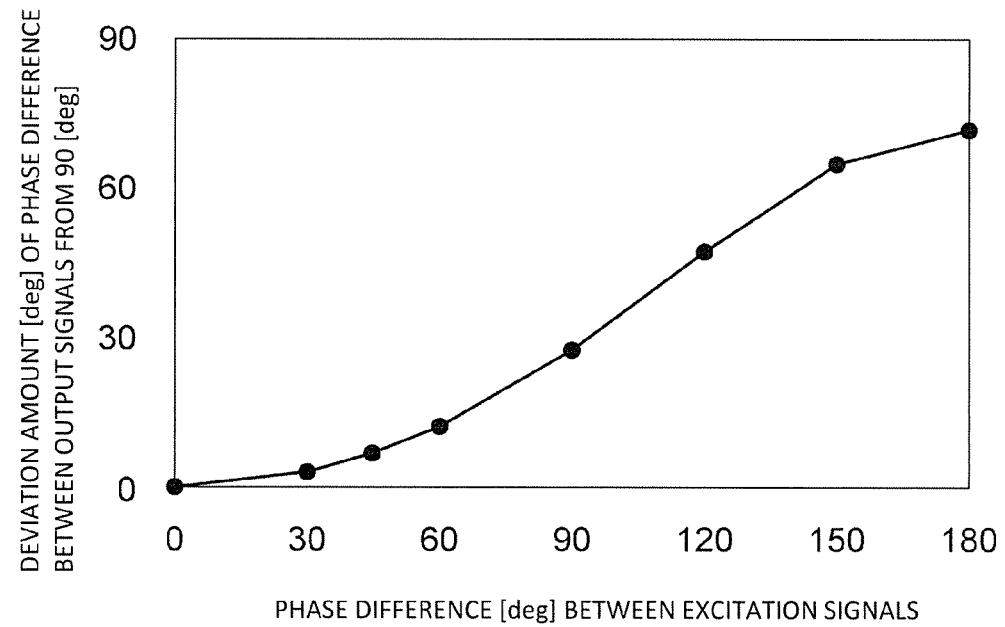
FIG. 7 is a graph for showing a relationship between a phase difference between an excitation signal in a first system and an excitation signal in a second system and a phase difference between an output signal of the first output windings and an output signal of the second output windings in the resolver 1 in the comparative example.

FIG. 7 is a graph for showing a relationship between the phase difference between the excitation signal in the first system 112A and the excitation signal in the second system 112B and a deviation amount of the phase difference between the output signal of the first output windings 109A and the output signal of the second output windings 110A from 90 (deg) in the resolver 1 in the comparative example. A deviation amount of a phase difference between the output signal of the first output windings 109B and the output signal of the second output windings 110B from 90 (deg) in the second system 112B is equivalent to the deviation amount of the phase difference between the output signal of the first output windings 109A and the output signal of the second output windings 110A from 90 (deg) in the first system 112A.

When the phase difference between the output signal of the first output windings 109A and the output signal of the second output windings 110A is 90 (deg), that is, the value on the vertical axis of FIG. 7 is 0 (deg), the accuracy of the first detected angle θ1 calculated by the angle calculation unit 114A is the highest. As the phase difference between the excitation signal of the excitation circuit 113A and the excitation signal of the excitation circuit 113B increases, the deviation amount of the phase difference between the output signal of the first output windings 109A and the output signal of the second output windings 110A from 90 (deg) increases.

Figure 8:
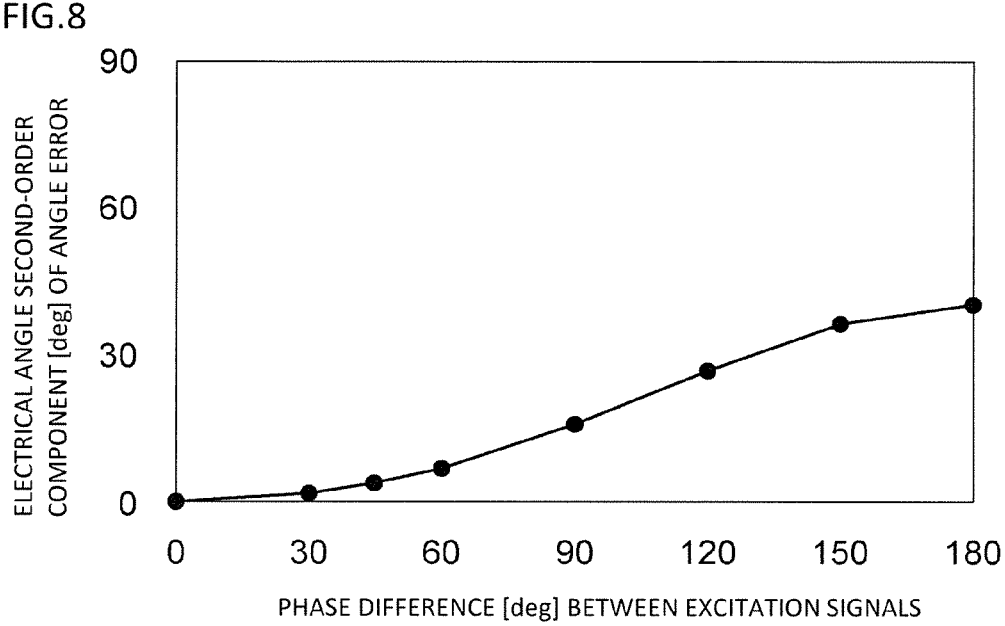
FIG. 8 is a graph for showing a relationship between the phase difference between the excitation signal in the first system and the excitation signal in the second system and an electrical angle second-order component of an angle error being a difference between a true value of an angle and a first detected angle of the rotor in the resolver 1 in the comparative example.

FIG. 8 is a graph for showing a relationship between the phase difference between the excitation signal in the first system 112A and the excitation signal in the second system 112B and an electrical angle second-order component of an angle error being a difference between a true value of the angle and the first detected angle θ1 of the rotor 102 in the resolver 1 in the comparative example. As the phase difference between the excitation signal of the excitation circuit 113A and the excitation signal of the excitation circuit 113B increases, the deviation amount of the phase difference between the output signal of the first output windings 109A and the output signal of the second output windings 110A from 90 (deg) increases. As a result, as the phase difference between the excitation signal of the excitation circuit 113A and the excitation signal of the excitation circuit 113B increases, the electrical angle second-order component of the angle error increases. The angle error causes a torque ripple that occurs to the rotating electric machine 2. Thus, in order to obtain the rotating electric machine 2 having a small torque ripple, the angle error is required to be small.

Figure 9:
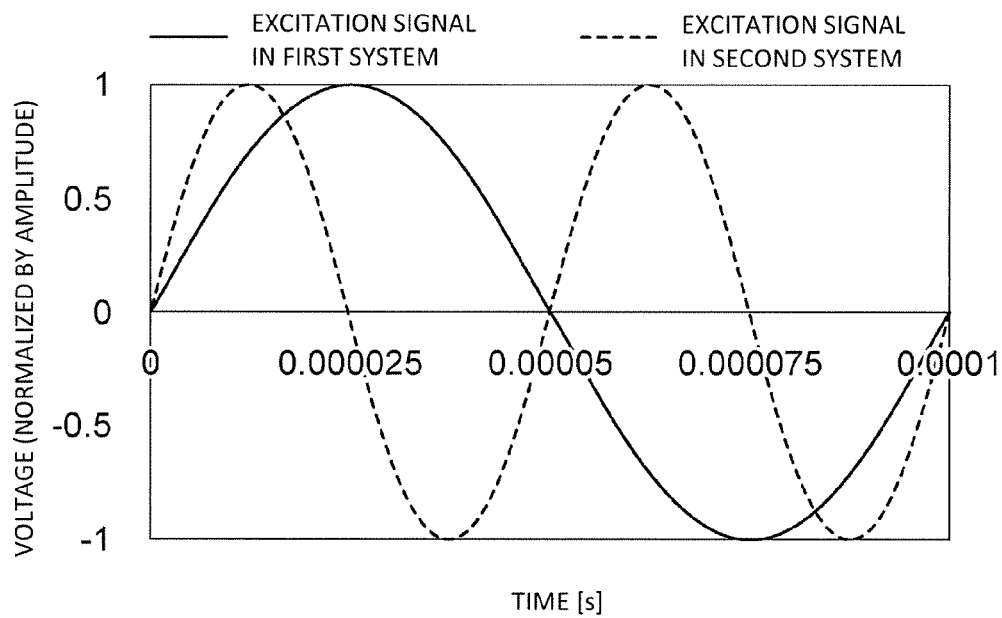
FIG. 9 is a graph for showing an excitation signal of an excitation circuit in the first system and an excitation signal of an excitation circuit in the second system in the resolver 1 according to the first embodiment.

FIG. 9 is a graph for showing the excitation signal of the excitation circuit 113A in the first system 112A and the excitation signal of the excitation circuit 113B in the second system 112B in the resolver 1 according to the first embodiment. In FIG. 9, values of voltages assigned to a vertical axis are normalized through use of a value of a voltage of the excitation signal of the excitation circuit 113A and a value of a voltage of the excitation signal of the excitation circuit 113B, respectively. A frequency T1 of the excitation signal of the excitation circuit 113A is 10 kHz. A frequency T2 of the excitation signal of the excitation circuit 113B is 20 kHz. It is only required that a relationship of T1:T2=1:2k be satisfied, where "k" is a natural number.

The angle calculation unit 114A has a function of deleting a frequency component of the excitation circuit 113B. The angle calculation unit 114B has a function of deleting a frequency component of the excitation circuit 113A. In other words, the angle calculation unit 114A removes, from the output signal of the first output windings 109A and the output signal of the second output windings 110A, a component corresponding to the frequency of the excitation signal supplied to the excitation windings 108B. Moreover, the angle calculation unit 114B removes, from the output signal of the first output windings 109B and the output signal of the second output windings 110B, a component corresponding to the frequency of the excitation signal supplied to the excitation windings 108A.

Further, in other words, the angle calculation unit 114A removes, from the output signal of the first output windings 109A and the output signal of the second output windings 110A, a magnetic interference component caused by the excitation signal in the second system 112B. Moreover, the angle calculation unit 114B removes, from the output signal of the first output windings 109B and the output signal of the second output windings 110B, a magnetic interference component caused by the excitation signal in the first system 112A.

Figure 10:
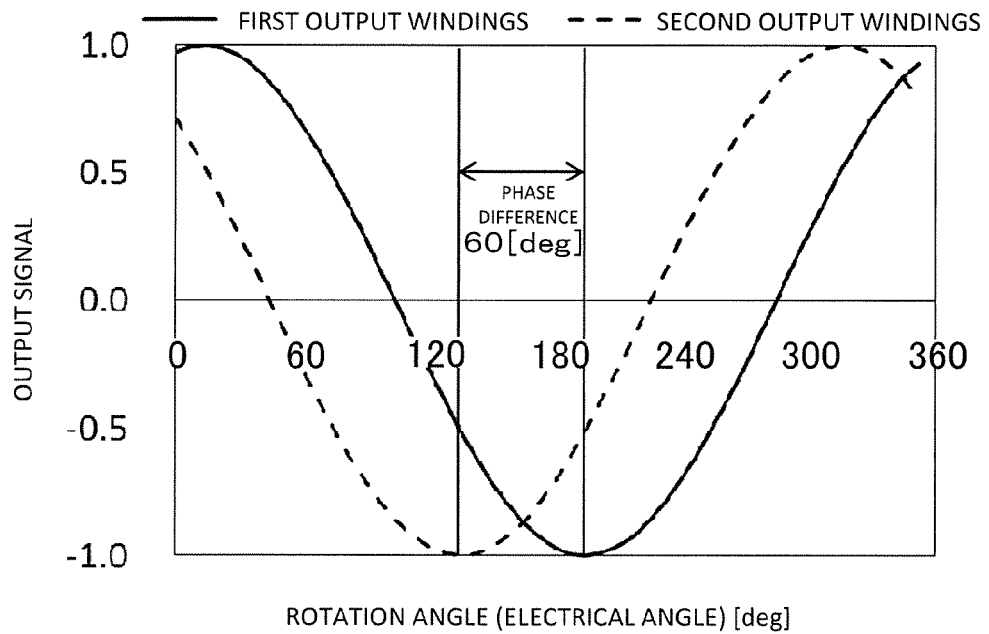
FIG. 10 is a graph for showing the output signal of the first output windings and the output signal of the second output windings at the time when the excitation circuits and angle calculation units in the resolver according to the first embodiment are used in the resolver in the comparative example 1.

FIG. 10 is a graph for showing the output signal of the first output windings 109A and the output signal of the second output windings 110A at the time when the excitation circuits and the angle calculation units in the resolver 1 according to the first embodiment are used in the resolver 1 in the comparative example 1. In FIG. 10, values of the output signals assigned to a vertical axis are normalized through use of a value of the output signal of the first output windings 109A and a value of the output signal of the second output windings 110A, respectively. Moreover, in FIG. 10, there are shown the output signal of the first output windings 109A and the output signal of the second output windings 110A from which the frequency component of the excitation signal in the second system 112B is removed.

The winding groups 105 in the first system 112A and the winding groups 105 in the second system 112B are divided in the circumferential direction. Moreover, the frequency T1 of the excitation signal in the first system 112A and the frequency T2 of the excitation signal in the second system 112B are different from each other. Further, the mutual influence of the excitation signals is removed between the first system 112A and the second system 112B. That is, when the focus is given to the first system 112A, there occurs, to the excitation windings 108B in the second system 112B, a physical state equivalent to a state in which the excitation signal in the second system 112B is not applied, and a failure such as disconnection occurs to the second system 112B. In this case, as shown in FIG. 10, the phase difference between the output signal of the first output windings 109A and the output signal of the second output windings 110A is not 90 (deg). As a result, the accuracy of the angle detection of the resolver 1 becomes lower. When the focus is given to the second system 112B, there occurs a state which is equivalent to the case in which the focus is given to the first system 112A.

Figure 11:
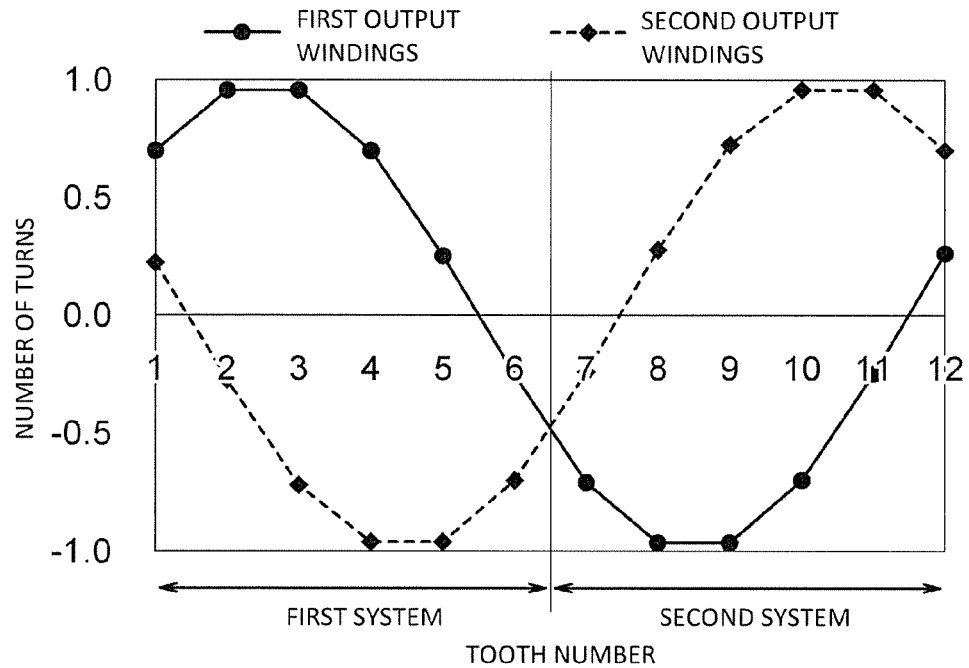
FIG. 11 is a graph for showing the numbers of turns of the first output windings and the numbers of turns of the second output windings of the resolver according to the first embodiment.

FIG. 11 is a graph for showing the numbers of turns of the first output windings 109 and the numbers of turns of the second output windings 110 of the resolver 1 according to the first embodiment. In FIG. 11, values of the numbers of turns assigned to a vertical axis are normalized through use of the values of the amplitudes of the numbers of turns of the first output windings 109 and the values of the amplitudes of the numbers of turns of the second output windings 110, respectively. In FIG. 11, values between the number of turns of the two first output windings 109 next to each other in the circumferential direction are linearly interpolated. Moreover, values between the number of turns of the two second output windings 110 next to each other in the circumferential direction are linearly interpolated. On an i-th tooth 107 being any one of the teeth 107 numbered from T1 to T12, the number of turns $N_{out1}$ of the first output winding 109 and the number of turns $N_{out2}$ of the second output winding 110 satisfy Expression (4), Expression (5), and Expression (6), which are given below.

$$N_{out1}=N_1 \cos\{|N_e \pm N_x|(i-1)/N_s \times 2\pi+\alpha\} \quad (4)$$

$$N_{out2}=N_1 \cos\{|N_e \pm N_x|(i-1)/N_s \times 2\pi+\beta\} \quad (5)$$

$$90(\text{deg})<|\alpha-\beta|<140(\text{deg}) \quad (6)$$

Figure 12:
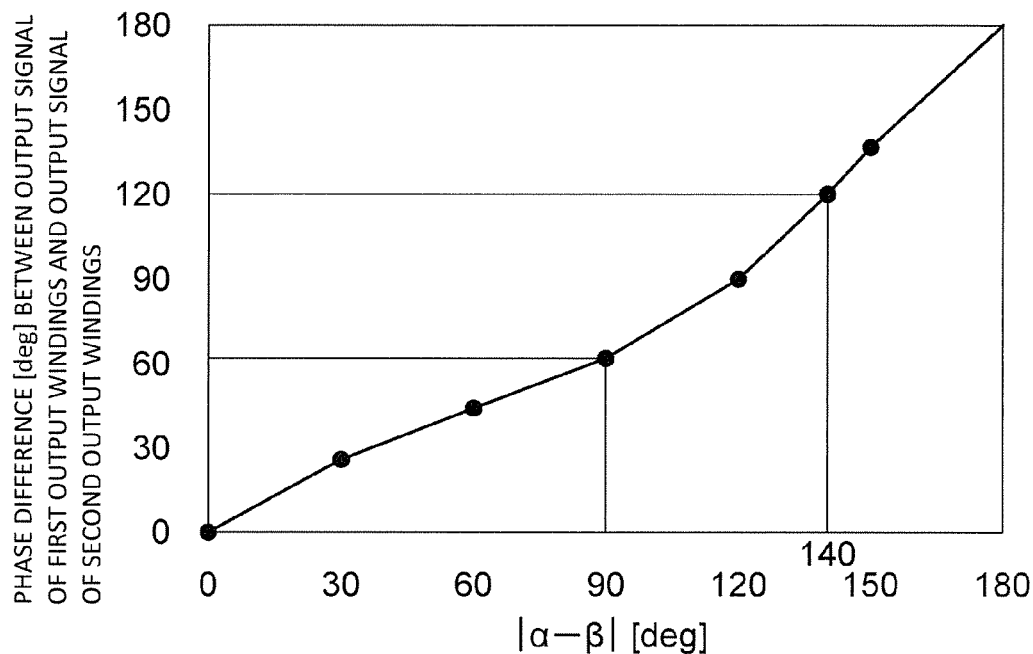
FIG. 12 is a graph for showing a relationship between a difference between an initial phase of the first output windings and an initial phase of the second output windings and a phase difference between the output signal of the first output windings and the output signal of the second output windings.

FIG. 12 is a graph for showing a relationship between a difference between the initial phase α of the first output windings 109 and the initial phase β of the second output windings 110 and the phase difference between the output signal of the first output windings 109 and the output signal of the second output windings 110. When 90(deg)<|α−β|<140 (deg) is satisfied, the phase difference between the output signal of the first output windings 109 and the output signal of the second output windings 110 is a value closer to 90 (deg) than that of the resolver 1 in the comparative example. Thus, in this case, even when magnetic interference exists between the first system 112A and the second system 112B, it is possible to acquire the detected angles as accurate as one at the time when the magnetic interference does not exist between the first system 112A and the second system 112B. In particular, when |α−β|=120 (deg) is satisfied, the phase difference between the output signal of the first output windings 109 and the output signal of the second output windings 110 is about 90 (deg). Thus, in this case, the accuracy of the detected angles of the resolver 1 is the highest. The initial phase β can be changed in response to the value of the initial phase α. The initial phase α and the initial phase β are such values that the phase difference between the output signal of the first output windings 109 and the output signal of the second output windings 110 is 90 (deg).

Figure 13:
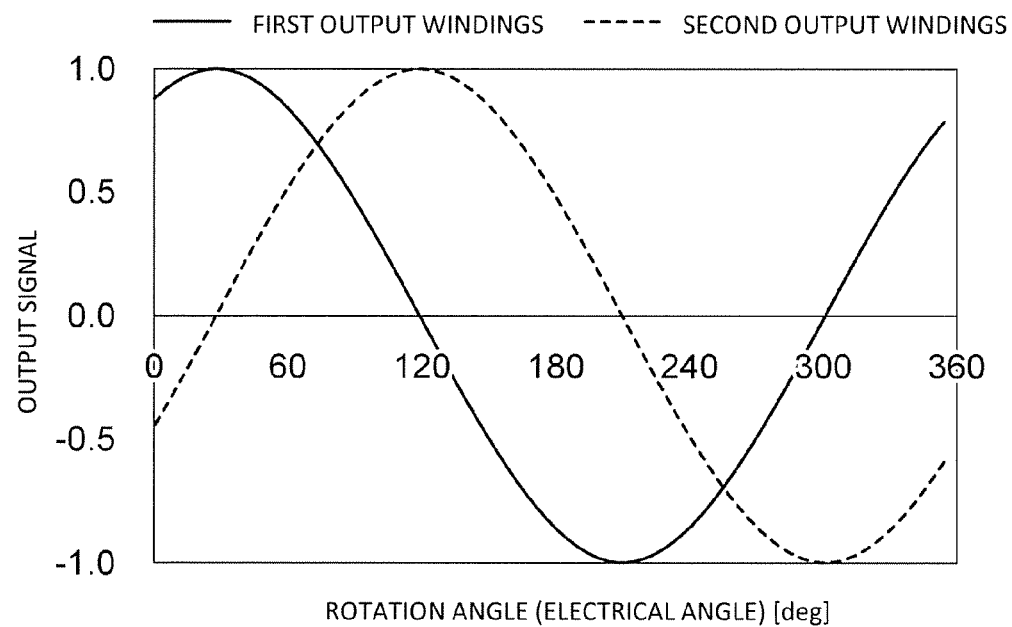
FIG. 13 is a graph for showing the output signal of the first output windings and the output signal of the second output windings of the resolver according to the first embodiment.

FIG. 13 is a graph for showing the output signal of the first output windings 109 and the output signal of the second output windings 110 of the resolver 1 according to the first embodiment. In FIG. 13, values of the output signals assigned to a vertical axis are normalized through use of the value of the amplitude of the output signal of the first output windings 109 and the value of the amplitude of the output signal of the second output windings 110, respectively. The numbers of turns of the first output windings 109 and the numbers of turns of the second output windings 110 satisfy Expression (4), Expression (5), and Expression (6), which are given above, and the phase difference between the output signal of the first output windings 109A and the output signal of the second output windings 110A is consequently a value close to 90 (deg). Accordingly, the accuracy of the detected angles of the resolver 1 can be increased. As a result, the increase in the electrical angle second-order component of the angle error can be suppressed. In FIG. 13, the output signal of the first output windings 109A and the output signal of the second output windings 110A in the first system 112A are shown. The output signal of the first output windings 109B and the output signal of the second output windings 110B in the second system 112B are equivalent to the output signal of the first output windings 109A and the output signal of the second output windings 110A in the first system 112A.

As described above, the resolver 1 according to the first embodiment satisfies Expression (4), Expression (5), and Expression (6), which are given above. Accordingly, the accuracy of the detected angles of the resolver 1 can be increased.

Second Embodiment

Figure 14:
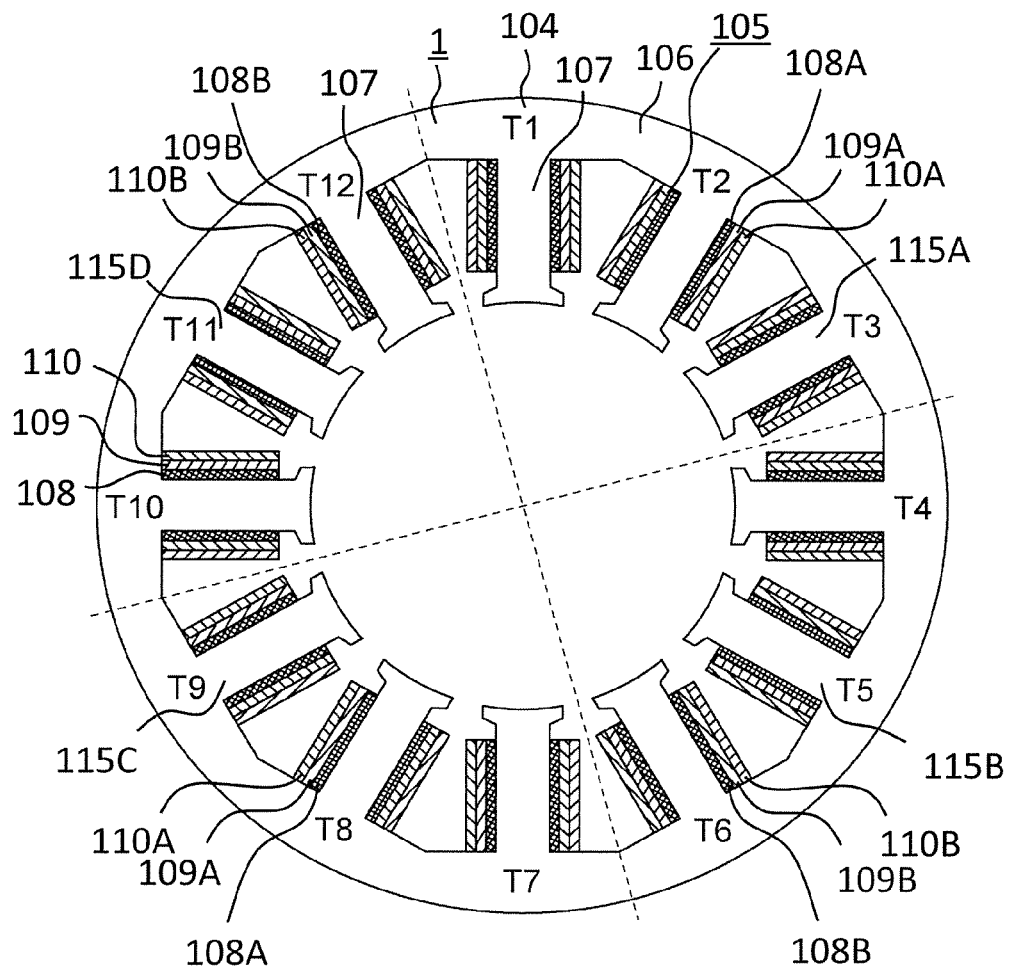
FIG. 14 is a sectional view for illustrating a stator of a resolver according to a second embodiment.

FIG. 14 is a sectional view for illustrating a stator of a resolver according to a second embodiment. The number $N_s$ of the teeth 107 is 12. The multiplication factor $N_x$ of the rotor 102 is five. The twelve teeth 107 is divided into four groups. The teeth 107 arranged in the circumferential direction, and numbered from T1 to T3 are included in the first tooth group 115A. The teeth 107 arranged in the circumferential direction, and numbered from T4 to T6 are included in the second tooth group 115B. The teeth 107 arranged in the circumferential direction, and numbered from T7 to T9 are included in a third tooth group 115C. The teeth 107 arranged in the circumferential direction, and numbered from T10 to T12 are included in a fourth tooth group 115D. The first tooth group 115A, the second tooth group 115B, the third tooth group 115C, and the fourth tooth group 115D are arranged in the circumferential direction.

On each tooth 107 included in the first tooth group 115A, the excitation winding 108A, the first output winding 109A, and the second output winding 110A are wound. On each tooth 107 included in the second tooth group 115B, the excitation winding 108B, the first output winding 109B, and the second output winding 110B are wound. On each tooth 107 included in the third tooth group 115C, the excitation winding 108A, the first output winding 109A, and the second output winding 110A are wound. On each tooth 107 included in the fourth tooth group 115D, the excitation winding 108B, the first output winding 109B, and the second output winding 110B are wound.

The winding groups 105 wound on the first tooth group 115A and the winding groups 105 wound on the third tooth group 115C are connected to each other in series. The winding groups 105 wound on the second tooth group 115B and the winding groups 105 wound on the fourth tooth group 115D are connected to each other in series.

The first tooth group 115A and the third tooth group 115C are arranged at positions opposed to each other in the radial direction. Thus, the winding groups 105 wound on the first tooth group 115A and the winding groups 105 wound on the third tooth group 115C are arranged at the positions opposed to each other in the radial direction. The second tooth group 115B and the fourth tooth group 115D are arranged at positions opposed to each other in the radial direction. Thus, the winding groups 105 wound on the second tooth group 115B and the winding groups 105 wound on the fourth tooth group 115D are arranged at the positions opposed to each other in the radial direction. The other configurations are the same as those in the first embodiment.

As described above, in the resolver 1 according to the second embodiment, the winding groups 105 wound on the first tooth group 115A and the winding groups 105 wound on the third tooth group 115C are arranged at the positions opposed to each other in the radial direction. Moreover, the winding groups 105 wound on the second tooth group 115B and the winding groups 105 wound on the fourth tooth group 115D are arranged at the positions opposed to each other in the radial direction. Accordingly, imbalance in magnetic flux at the time when the stator 101 is eccentric is moderated in the stator core 104. As a result, each of the shapes of the output signal of the first output windings 109 and the output signal of the second output windings 110 is in a form of a sine wave. Accordingly, the accuracy of the detected angles of the resolver 1 can be increased.

Third Embodiment

Figure 15:
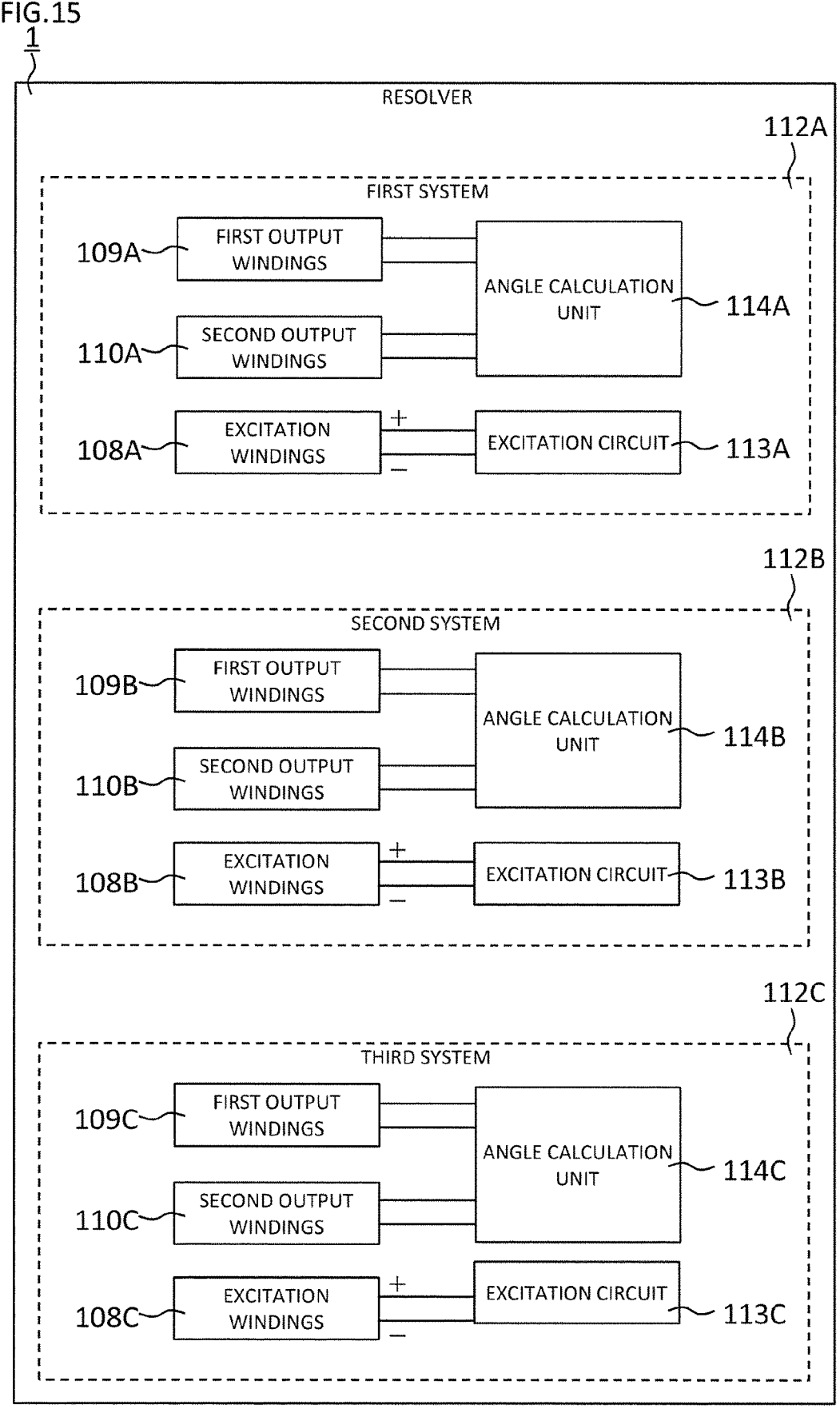
FIG. 15 is a block diagram for illustrating a resolver according to a third embodiment.
Figure 16:
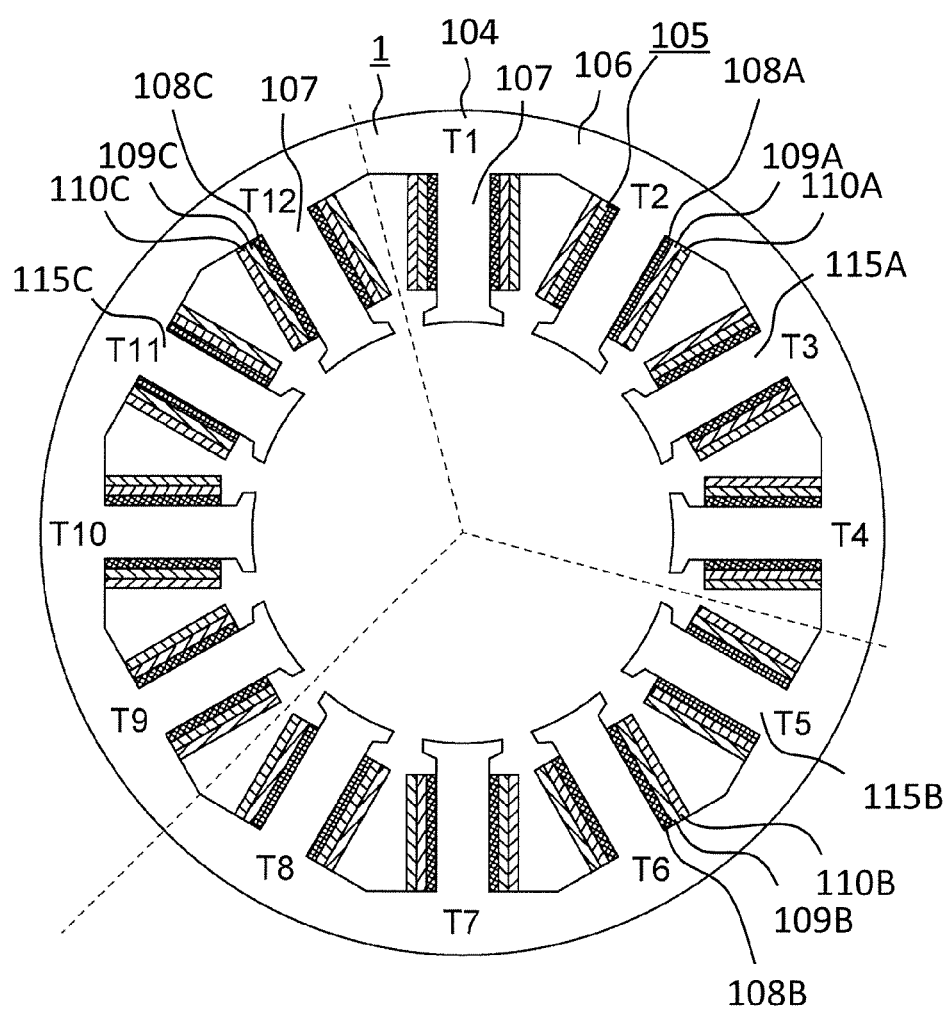
FIG. 16 is a sectional view for illustrating a stator of the resolver according to the third embodiment.

FIG. 15 is a block diagram for illustrating a resolver according to a third embodiment. FIG. 16 is a sectional view for illustrating a stator of the resolver according to the third embodiment. The resolver 1 includes the first system 112A, the second system 112B, and a third system 112C. Thus, the number M of systems is three. Each of winding groups 105 included in the first system 112A includes the excitation winding 108A, the first output winding 109A, and the second output winding 110A. Each of the winding groups 105 included in the second system 112B includes the excitation winding 108B, the first output winding 109B, and the second output winding 110B. Each of the winding groups 105 included in the third system 112C includes an excitation winding 108C, a first output winding 109C, and a second output winding 110C.

The resolver 1 includes the excitation circuit 113A included in the first system 112A, the excitation circuit 113B included in the second system 112B, and an excitation circuit 113C included in the third system 112C. Further, the resolver 1 includes the angle calculation unit 114A included in the first system 112A, the angle calculation unit 114B included in the second system 112B, and an angle calculation unit 114C included in the third system 112C. The angle calculation unit 114A, the angle calculation unit 114B, and the angle calculation unit 114C are included in the angle calculation device 103 of FIG. 1.

The twelve teeth 107 is divided into three groups. The teeth 107 arranged in the circumferential direction, and numbered from T1 to T4 are included in the first tooth group 115A. The teeth 107 arranged in the circumferential direction, and numbered from T5 to T8 are included in the second tooth group 115B. The teeth 107 arranged in the circumferential direction, and numbered from T9 to T12 are included in a third tooth group 115C. The first tooth group 115A, the second tooth group 115B, and the third tooth group 115C are arranged in the circumferential direction.

On each tooth 107 included in the first tooth group 115A, the excitation winding 108A, the first output winding 109A, and the second output winding 110A are wound. On each tooth 107 included in the second tooth group 115B, the excitation winding 108B, the first output winding 109B, and the second output winding 110B are wound. On each tooth 107 included in the third tooth group 115C, the excitation winding 108C, the first output winding 109C, and the second output winding 110C are wound.

The excitation windings 108A are connected to the excitation circuit 113A through excitation terminals (not shown). The excitation windings 108B are connected to the excitation circuit 113B through excitation terminals (not shown). The excitation windings 108C are connected to the excitation circuit 113C through excitation terminals (not shown). The excitation circuit 113A, the excitation circuit 113B, and the excitation circuit 113C are independent of each other.

The first output windings 109A and the second output windings 110A are connected to the angle calculation unit 114A through output terminals (not shown), respectively. The first output windings 109B and the second output windings 110B are connected to the angle calculation unit 114B through output terminals (not shown), respectively. The first output windings 109C and the second output windings 110C are connected to the angle calculation unit 114C through output terminals (not shown), respectively.

The angle calculation unit 114A uses the output signal of the first output windings 109A and the output signal of the second output windings 110A to calculate a first detected angle $\theta 1$ as the angle of the rotor 102. The angle calculation unit 114B uses the output signal of the first output windings 109B and the output signal of the second output windings 110B to calculate the second detected angle $\theta 2$ as the angle of the rotor 102. The angle calculation unit 114C uses the output signal of the first output windings 109C and the output signal of the second output windings 110C to calculate a third detected angle $\theta 3$ as the angle of the rotor 102. The other configurations are the same as those in the first embodiment.

As described above, the resolver 1 according to the third embodiment includes the first system 112A, the second system 112B, and the third system 112C. Accordingly, even when a failure occurs to one system of the first system 112A, the second system 112B, or the third system 112C, the resolver 1 can use the remaining two systems to detect the angle of the rotor. As a result, the resolver 1 can more safely detect the angle of the rotor 102.

Fourth Embodiment

Figure 17:
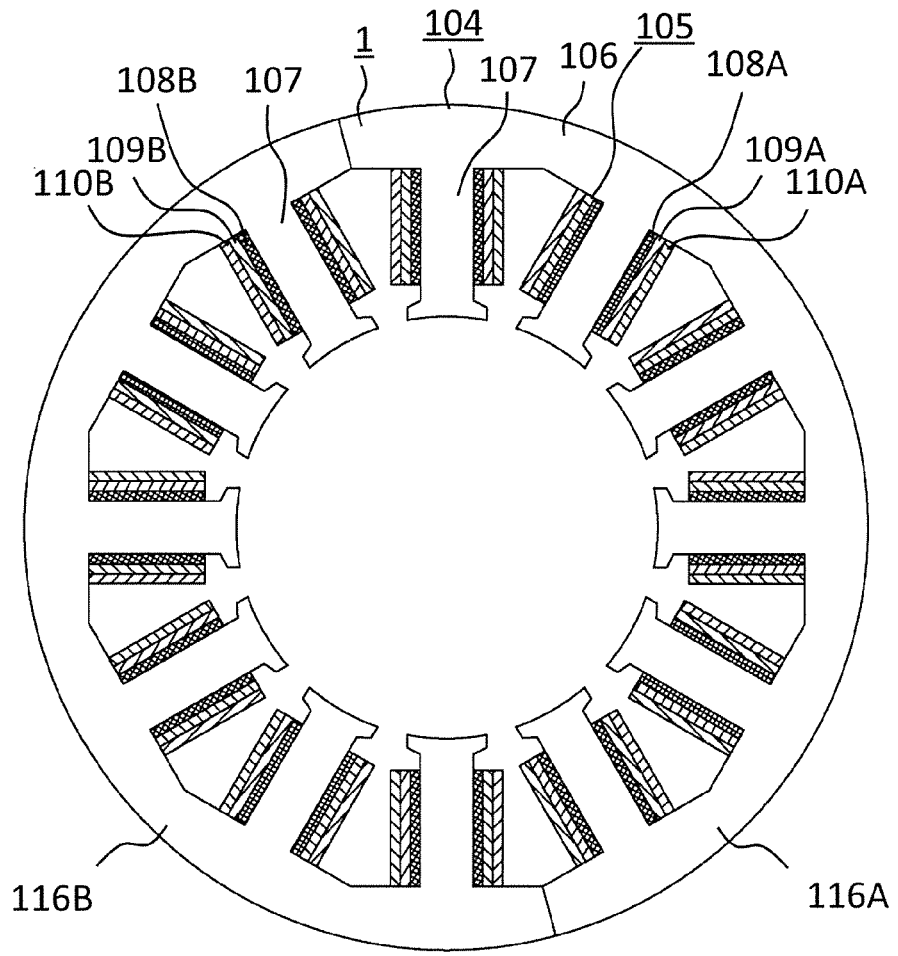
FIG. 17 is a sectional view for illustrating a stator of a resolver according to a fourth embodiment.
Figure 18:
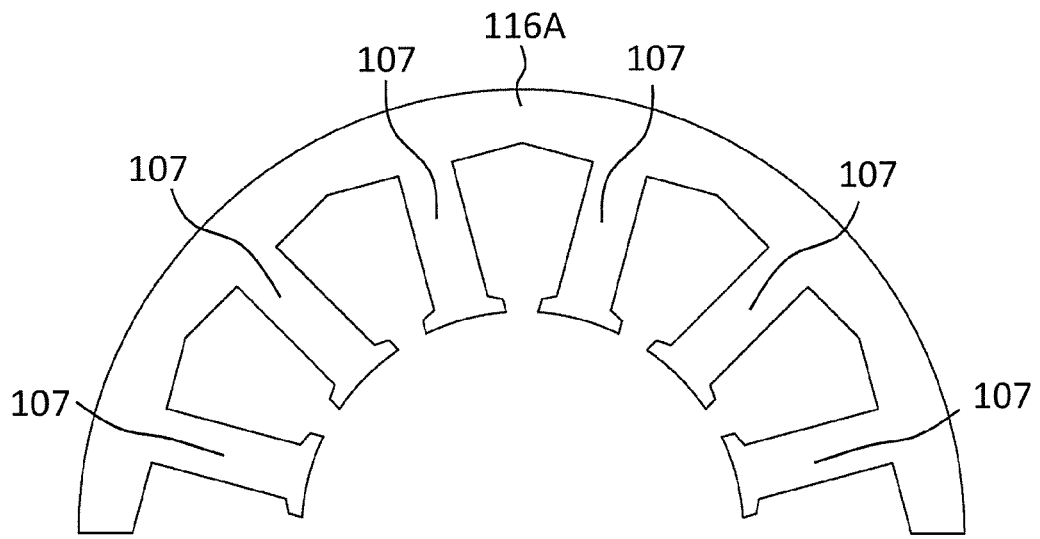
FIG. 18 is a front view for illustrating a part of a stator core of FIG. 17.

FIG. 17 is a sectional view for illustrating a stator of a resolver according to a fourth embodiment. FIG. 18 is a front view for illustrating a part of a stator core of FIG. 17. In the fourth embodiment, the stator core 104 is divided into two core segments. One core segment of the two core segments is a first core segment 116A, and the other core segment is a second core segment 116B. On each tooth 107 of the first core segment 116A, the winding group 105 in the first system 112A is wound. That is, on each tooth 107 of the first core segment 116A, the excitation winding 108A, the first output winding 109A, and the second output winding 110A are wound. On each tooth 107 of the second core segment 116B, the winding group 105 in the second system 112B is wound. That is, on each tooth 107 of the second core segment 116B, the excitation winding 108B, the first output winding 109B, and the second output winding 110B are wound.

In FIG. 18, the first core segment 116A is illustrated. The first core segment 116A is formed into an arc shape. Although illustration is omitted, the second core segment 116B is also formed into the arc shape. Accordingly, the winding group 105 can easily be wound on each tooth 107 of the first core segment 116A and each tooth 107 of the second core segment 116B. After the winding group 105 is wound on each tooth 107 of the first core segment 116A and each tooth 107 of the second core segment 116B, the first core segment 116A and the second core segment 116B are connected to each other. Accordingly, the stator core 104 is formed, and the rotor 102 is formed. The other configurations are the same as those in the first embodiment to the third embodiment.

As described above, in the resolver according to the fourth embodiment, the stator core 104 is divided into the two core segments. As a result, a winding operation becomes easier. Accordingly, manufacturing efficiency of the resolver 1 can be increased.

Fifth Embodiment

Figure 19:
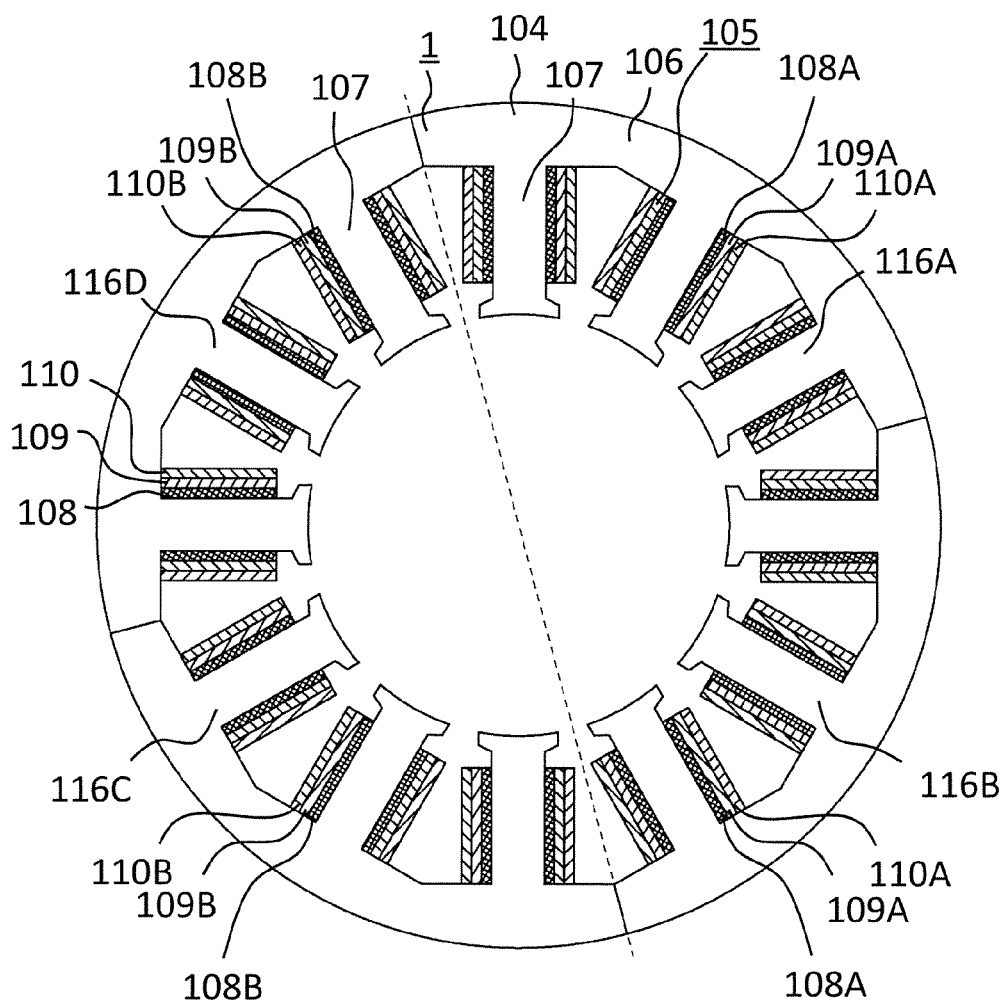
FIG. 19 is a sectional view for illustrating a stator of a resolver according to a fifth embodiment.
Figure 20:
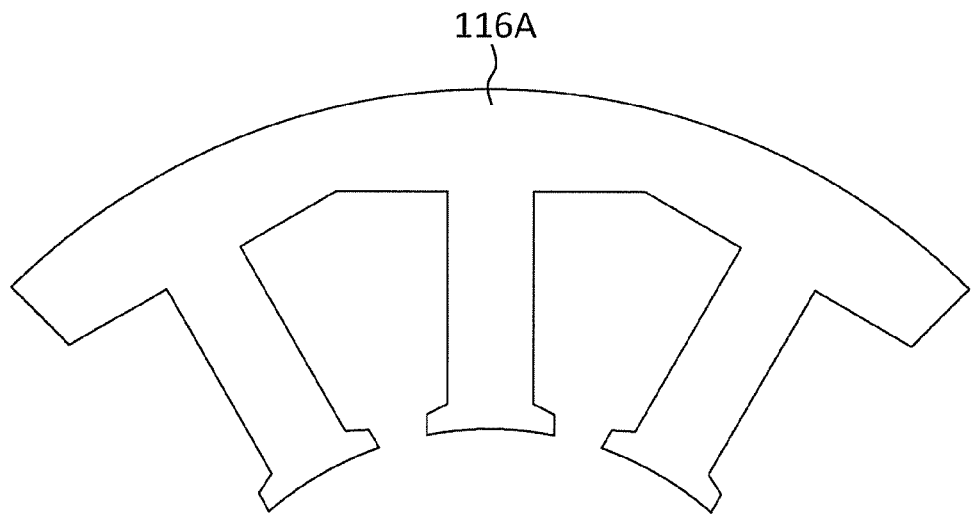
FIG. 20 is a front view for illustrating a part of a stator core of FIG. 19.

FIG. 19 is a sectional view for illustrating a stator of a resolver according to a fifth embodiment. FIG. 20 is a front view for illustrating a part of a stator core of FIG. 19. In the fifth embodiment, the stator core 104 is divided into four core segments. The four core segments are formed of the first core segment 116A, the second core segment 116B, a third core segment 116C, and a fourth core segment 116D. The first core segment 116A, the second core segment 116B, the third core segment 116C, and the fourth core segment 116D are arranged in the circumferential direction.

On each tooth 107 of the first core segment 116A, the winding group 105 in the first system 112A is wound. That is, on each tooth 107 of the first core segment 116A, the excitation winding 108A, the first output winding 109A, and the second output winding 110A are wound. On each tooth 107 of the second core segment 116B, the winding group 105 in the first system 112A is wound. That is, on each tooth 107 of the second core segment 116B, the excitation winding 108A, the first output winding 109A, and the second output winding 110A are wound.

On each tooth 107 of the third core segment 116C, the winding group 105 in the second system 112B is wound. That is, on each tooth 107 of the third core segment 116C, the excitation winding 108B, the first output winding 109B, and the second output winding 110B are wound. On each tooth 107 of the fourth core segment 116D, the winding group 105 in the second system 112B is wound. That is, on each tooth 107 of the fourth core segment 116D, the excitation winding 108B, the first output winding 109B, and the second output winding 110B are wound.

In FIG. 20, the first core segment 116A is illustrated. The first core segment 116A is formed into the arc shape. Although illustration is omitted, the second core segment 116B, the third core segment 116C, and the fourth core segment 116D are also formed into the arc shape. Accordingly, the winding group 105 can easily be wound on each tooth 107 of the first core segment 116A, each tooth 107 of the second core segment 116B, each tooth 107 of the third core segment 116C, and each tooth 107 of the fourth core segment 116D. After the winding group 105 is wound on each tooth 107 of the first core segment 116A, each tooth 107 of the second core segment 116B, each tooth 107 of the third core segment 116C, and each tooth 107 of the fourth core segment 116D, the first core segment 116A, the second core segment 116B, the third core segment 116C, and the fourth core segment 116D are connected to each other. Accordingly, the stator core 104 is formed, and the stator is formed.

Figure 21:
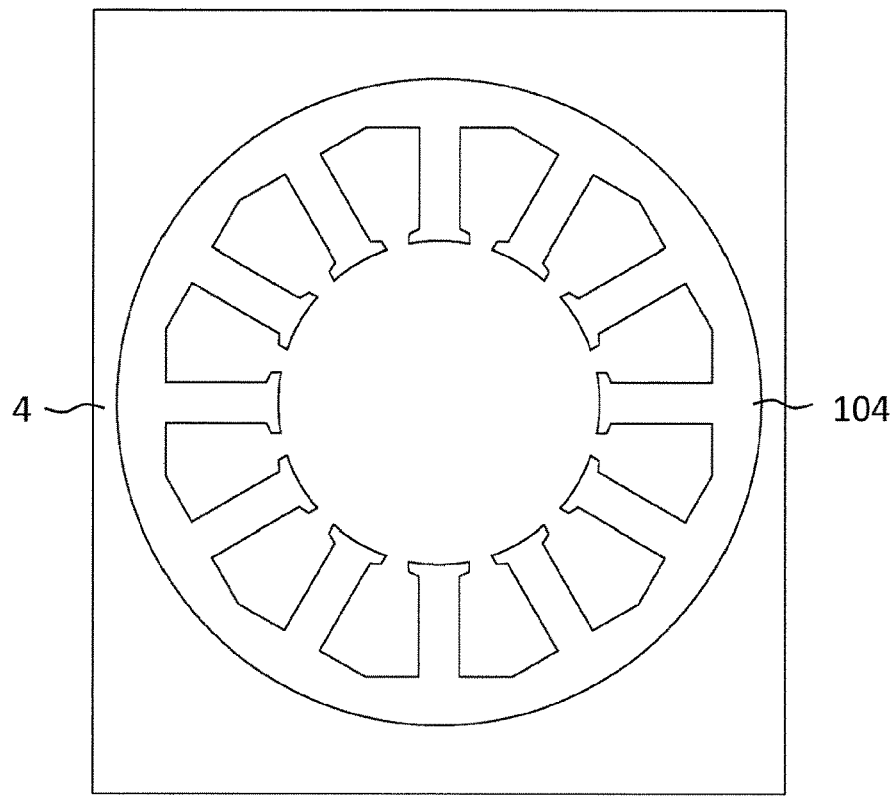
FIG. 21 is a plan view for illustrating a core sheet from which the stator core is to be punched out when the stator core is not divided.
Figure 22:
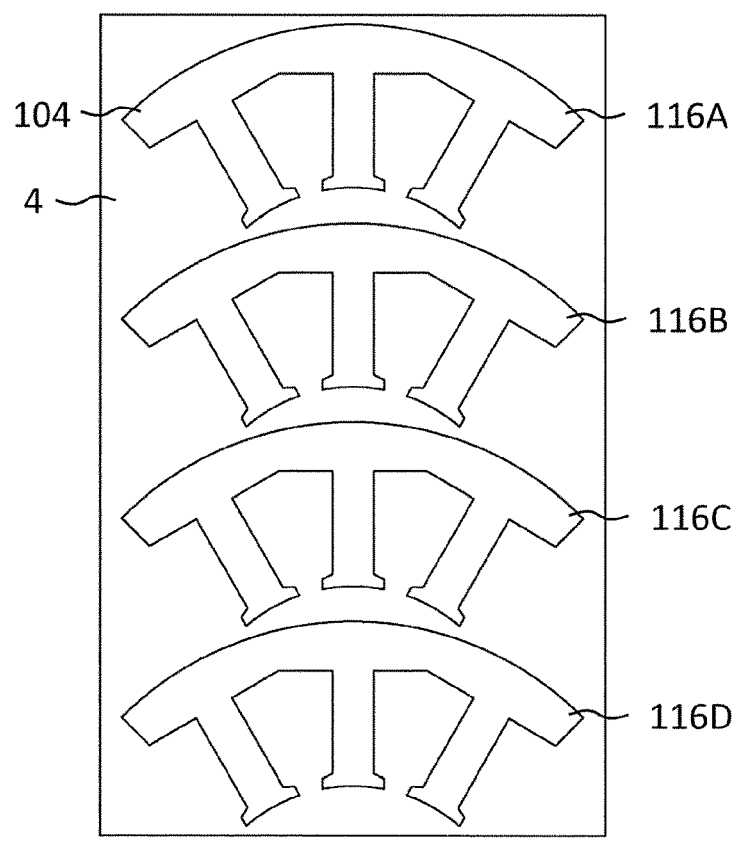
FIG. 22 is a plan view for illustrating a core sheet from which four core segments are to be punched out when the stator core is divided into the four core segments.

FIG. 21 is a plan view for illustrating a core sheet from which the stator core 104 is to be punched out when the stator core 104 is not divided. FIG. 22 is a plan view for illustrating a core sheet from which four core segments are to be punched out when the stator core 104 is divided into the four core segments. In FIG. 22, the four core segments are punched out from the core sheet 4 under a state in which the four core segments are arranged straight in a row. Thus, compared with the case in which the stator core 104 is not divided, it is possible to reduce a dimension in a width direction of the core sheet 4 from which the four core segments are punched out.

As described above, in the resolver 1 according to the fifth embodiment, the stator core 104 is divided into the four core segments. Accordingly, compared with the case in which the stator core 104 is not divided, it is possible to reduce the dimension in the width direction of the core sheet 4 from which the four core segments are punched out. As a result, a yield of the stator core 104 can be increased.

Moreover, in the resolver 1 according to the fifth embodiment, the four core segments are punched out from the core sheet 4 under the state in which the four core segments are arranged straight in a row. Accordingly, it is possible to reduce influence of magnetic anisotropy of the core sheet 4. As a result, the accuracy of the detected angles of the resolver 1 can be increased.

In the fifth embodiment, description is given of the configuration in which the number of core segments forming the stator core 104 is four. The number of the core segments forming the stator core 104 is not limited to four, and may be another number.

Sixth Embodiment

Figure 23:
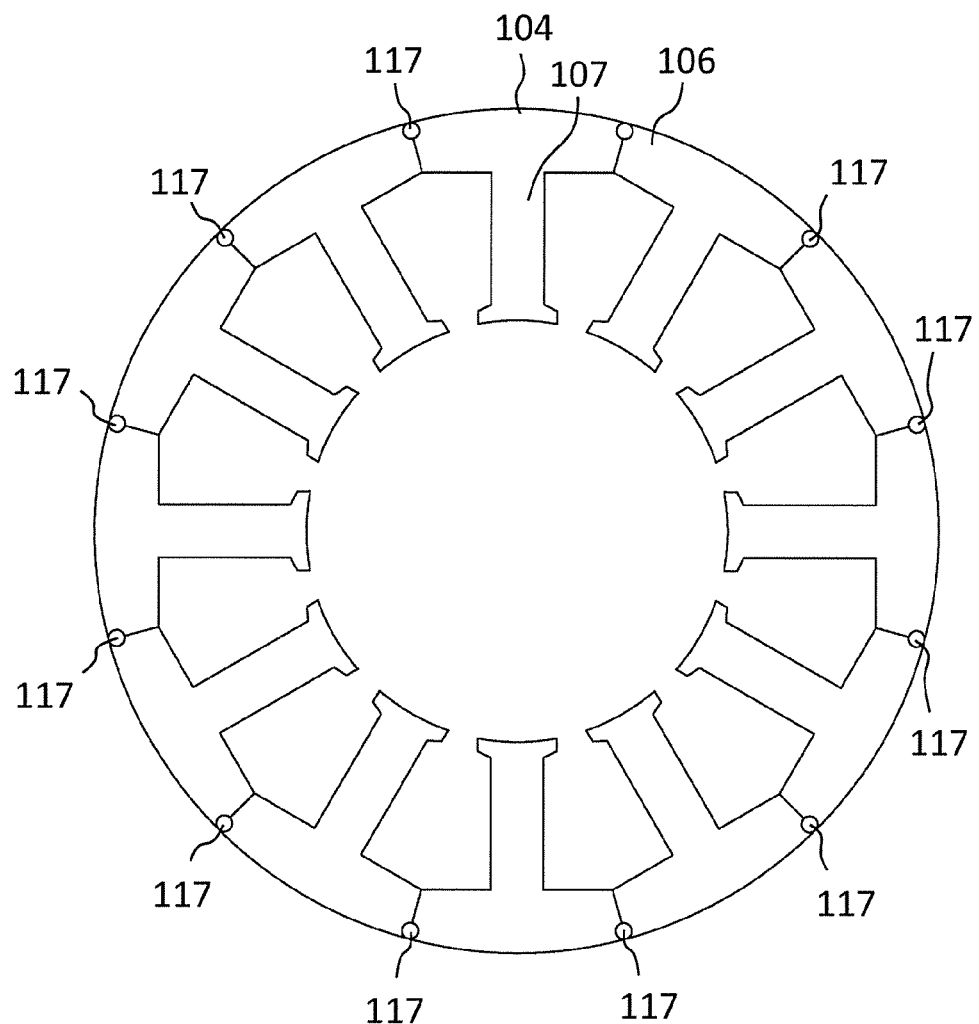
FIG. 23 is a plan view for illustrating a stator core of a resolver according to a seventh embodiment.
Figure 24:
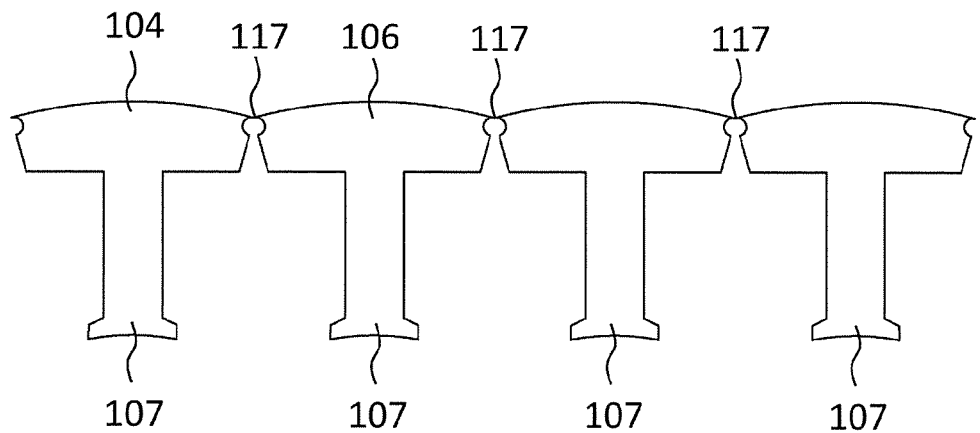
FIG. 24 is a plan view for illustrating a part of the stator core of FIG. 23.

FIG. 23 is a plan view for illustrating a stator core of a resolver according to a seventh embodiment. FIG. 24 is a plan view for illustrating a part of the stator core of FIG. 23. The back yoke 106 includes a plurality of deformation portions 117. In FIG. 23, the back yoke 106 includes twelve deformation portions 117. As a result of the deformation of the deformation portions 117, the stator core 104 deforms between an annular shape and a line shape. In FIG. 23, the stator core 104 in the annular shape is illustrated. In FIG. 24, the stator core 104 in the line shape is illustrated. When the winding group 105 is wound on each tooth 107 of the stator core 104, the shape of the stator core 104 is the line shape. In this case, each gap between the two teeth 107 next to each other is increased. After the winding group 105 is wound on each tooth 107 of the stator core 104, the shape of the stator core 104 becomes the annular shape. The other configurations are the same as those in the first embodiment to the fifth embodiment.

As described above, in the resolver 1 according to the seventh embodiment, the stator core 104 can deform between the annular shape and the line shape. Accordingly, the winding operation becomes easier, thereby increasing manufacturing efficiency of the resolver 1.

Seventh Embodiment

Figure 25:
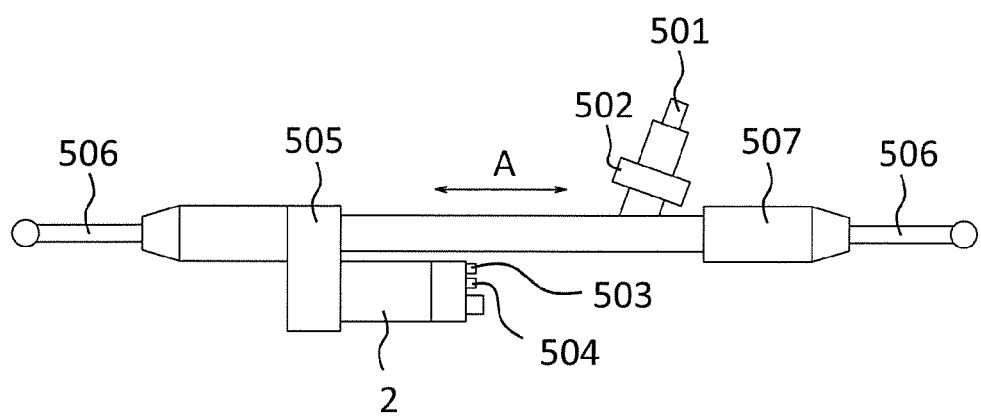
FIG. 25 is a front view for illustrating an electric power steering device according to the seventh embodiment.

FIG. 25 is a front view for illustrating an electric power steering device according to the seventh embodiment. A steering wheel (not shown) is steered by a driver. A torque of the steering wheel is transmitted to a shaft 501. A torque of the shaft 501 is measured by a torque sensor 502. A measurement result of the torque sensor 502 is converted to an electric signal, and the electric signal is further transmitted to a power supply source (not shown) in the first system 112A and a power supply source (not shown) in the second system 112B via cables (not shown).

Meanwhile, information on the vehicle including a vehicle speed is converted to electric signals, and the electric signals are further transmitted to the power supply source in the first system 112A and the power supply source in the second system 112B via cables (not shown). Each of the power supply source in the first system 112A and the power supply source in the second system 112B uses the measurement result of the torque sensor 502 and the information on the vehicle to calculate a required assist torque, and further supplies a current to the rotating electric machine 2 through an inverter based on a calculation result.

The rotating electric machine 2 is arranged so that a rotation axis of the rotating electric machine 2 is parallel with a movement direction A of a rack shaft. Power is supplied to the power supply source in the first system 112A from a battery (not shown) and an alternator (not shown) through a first power supply connector 503. Power is supplied to the power supply source in the second system 112B from the battery (not shown) and the alternator (not shown) via a second power supply connector 504. A torque generated on the rotating electric machine 2 is transmitted to a gear box 505 including a belt and a ball screw. The torque transmitted to the gear box 505 is reduced in speed by the gear box 505, to thereby generate thrust that moves the rack shaft in the axial direction. A steering force of the driver is assisted through the generation of the thrust that moves the rack shaft. Tie rods 506 move through the movement of the rack shaft, and tires (not shown) are consequently steered. Accordingly, the vehicle turns. The driver can turn the vehicle by a small steering force through the assist for the steering force by the torque generated in the rotating electric machine 2. Rack boots 507 prevent foreign matter from entering inside the electric power steering device.

In the electric power steering device, a cogging torque and torque ripple that occur to the rotating electric machine 2 are transmitted to the driver via the gear box 505. Thus, for providing satisfactory steering feel to the driver, it is preferred that the cogging torque and the torque ripple that occur to the rotating electric machine 2 be small. Moreover, for providing the satisfactory steering feel to the driver, it is preferred that vibration and noise that occur when the rotating electric machine 2 operates be small.

Even when a failure occurs to one of the first system 112A or the second system 112B in the resolver 1, the resolver 1 detects the rotation angle of the rotor 102. Accordingly, the electric power steering device can more reliably output an assist force. Moreover, comfortable steering feel can be provided to the driver through the increase in the detection accuracy of the resolver 1.

As described above, the electric power steering device according to the seventh embodiment includes the resolver 1 and the rotating electric machine 2. The rotating electric machine 2 includes the rotating-electric-machine rotor, the rotation angle of which is measured by the resolver 1. Accordingly, the comfortable steering feel can be provided to the driver.

REFERENCE SIGNS LIST

1 resolver, 2 rotating electric machine, 3 shaft, 4 core sheet, 101 stator, 102 rotor, 103 angle calculation device, 104 stator core, 105 winding group, 106 back yoke, 107 tooth, 108, 108A, 108B, 108C excitation winding, 109, 109A, 109B, 109C first output winding, 110, 110A, 110B, 110C second output winding, 111 salient pole, 112A first system, 112B second system, 112C third system, 113A, 113B, 113C excitation circuit, 114A, 114B, 114C angle calculation unit, 115A first tooth group, 115B second tooth group, 115C third tooth group, 115D fourth tooth group, 116A first core segment, 116B second core segment, 116C third core segment, 116D fourth core segment, 117 deformation portion, 501 shaft, 502 torque sensor, 503 first power supply connector, 504 second power supply connector, 505 gear box, 506 tie rod, 507 rack boot

The invention claimed is:

1. A resolver, comprising:

a stator; and a rotor which rotates with respect to the stator, wherein the rotor includes a plurality of salient poles;

wherein the stator includes:

a stator core having a plurality of teeth arranged in a circumferential direction, and a plurality of winding groups each of which is provided on each tooth, and has an excitation winding, a first output winding, and a second output winding, wherein the winding groups are divided into a plurality of systems, wherein the numbers of turns of the excitation windings are distributed in a form of a sine wave of $N_e$-th spatial order, where $N_e$ is a spatial order of the excitation windings, wherein each of the numbers of turns of the first output windings and the numbers of turns of the second output windings are distributed in a form of a sine wave of $|N_e \pm N_x|$-th spatial order where $N_x$ is the number of salient poles, and wherein the following expressions are satisfied, $$N_{out1} = N_1 \cos\{|N_e \pm N_x|(i-1)/N_s \times 2\pi + \alpha\},$$

$$N_{out2} = N_1 \cos\{|N_e \pm N_x|(i-1)/N_s \times 2\pi + \beta\}, \text{ and}$$

$$90(\deg) < |\alpha - \beta| < 140(\deg)$$

where $N_s$ is the number of teeth, "i" is a natural number being one of 1, 2, ..., or $N_s$, $N_{out1}$ is the number of turns of the first output winding wound on an i-th tooth, $N_{out2}$ is the number of turns of the second output winding wound on the i-th tooth, $N_1$ is an amplitude of each of the number of turns of the first output winding and the number of turns of the second output winding, α is a positive number and is an initial phase of the numbers of turns of the first output windings, and β is a positive number and is an initial phase of the numbers of turns of the second output windings, wherein the initial phase α and the initial phase β are such values that a phase difference between an output signal of the first output windings that is different from the initial phase α and an output signal of the second output windings that is different from the initial phase β is 90 (deg), wherein frequencies of excitation signals supplied to the excitation windings of the respective systems are different from one another, and wherein the resolver further comprises a plurality of angle calculation units each of which is provided to each system, and is configured to use the output signal of the first output windings and the output signal of the second output windings to calculate an angle of the rotor, wherein each angle calculation unit is configured to remove components corresponding to the frequencies of the excitation signals supplied to the excitation windings in the systems, which are different from one another, from the output signal of the first output windings and the output signal of the second output windings.

2. The resolver according to claim 1, wherein the value of $|N_e \pm N_x|$ is different from a value of an integer multiple of M where M is the number of systems.

3. The resolver according to claim 1, wherein the number $N_x$ of salient poles is an odd number.

4. The resolver according to claim 1, wherein the number of systems is two.

5. An electric power steering device, comprising:
the resolver of claim 1; and
a rotating electric machine which includes a rotating-electric-machine rotor, a rotation angle of which is measured by the resolver.

* * * * *